(12) United States Patent
Rodrigues et al.

(10) Patent No.: US 10,504,239 B2
(45) Date of Patent: Dec. 10, 2019

(54) METHODS AND SYSTEMS FOR CAMERA CHARACTERIZATION IN TERMS OF RESPONSE FUNCTION, COLOR, AND VIGNETTING UNDER NON-UNIFORM ILLUMINATION

(71) Applicant: UNIVERSIDADE DE COIMBRA, Coimbra (PT)

(72) Inventors: Pedro Miguel Cerveira Rodrigues, Coimbra (PT); João Pedro de Almeida Barreto, Coimbra (PT)

(73) Assignee: Universidade de Coimbra, Coimbra (PT)

( * ) Notice: Subject to any disclaimer, the term of this patent is extended or adjusted under 35 U.S.C. 154(b) by 112 days.

(21) Appl. No.: 15/566,536

(22) PCT Filed: Apr. 13, 2016

(86) PCT No.: PCT/US2016/027299
§ 371 (c)(1),
(2) Date: Oct. 13, 2017

(87) PCT Pub. No.: WO2016/168307
PCT Pub. Date: Oct. 20, 2016

(65) Prior Publication Data
US 2018/0089855 A1    Mar. 29, 2018

Related U.S. Application Data

(60) Provisional application No. 62/146,643, filed on Apr. 13, 2015.

(51) Int. Cl.
*H04N 1/60*        (2006.01)
*H04N 5/357*      (2011.01)
(Continued)

(52) U.S. Cl.
CPC ............... *G06T 7/80* (2017.01); *G06T 7/11* (2017.01); *G06T 7/174* (2017.01); *G06T 7/90* (2017.01);
(Continued)

(58) Field of Classification Search
CPC ... G06T 7/11; G06T 7/174; G06T 7/80; G06T 7/90; G06T 15/506; G06T 2207/10024;
(Continued)

(56) References Cited

U.S. PATENT DOCUMENTS

| | | | |
|---|---|---|---|
| 5,313,306 A | 5/1994 | Kuban et al. | |
| 5,767,980 A * | 6/1998 | Wang | B41F 33/0036 358/475 |

(Continued)

FOREIGN PATENT DOCUMENTS

| | | |
|---|---|---|
| EP | 1759629 A1 | 3/2007 |
| EP | 2153794 A2 | 2/2010 |

(Continued)

OTHER PUBLICATIONS

Fu et al. ("Camera response function estimation and application with a single image," Informatics in Control, Automation and Robotics, vol. 2, LNEE 133, 2011) (Year: 2011).*

(Continued)

*Primary Examiner* — Yubin Hung
(74) *Attorney, Agent, or Firm* — Greenberg Traurig, LLP; David J. Dykeman; Jonathan E. Giroux

(57) ABSTRACT

Methods and systems for describing a camera radiometrically, in terms of camera response function and vignetting, and in terms of color, suitable for non-uniform illumination set-ups. It estimates the camera response function and the camera color mapping from a single image of a generic scene with two albedos. With a second same-pose image with a different intensity of the near-light the vignetting is (Continued)

also estimated. The camera response function calibration involves the segmentation of the two albedos, the definition of the system of equations based on the assumption that can be made about the image formation process, and the actual estimation. For the modelling the vignetting there are three steps: computing the albedo-normalized irradiance, finding points of equal vignetting, when needed, and estimation.

22 Claims, 16 Drawing Sheets

(51) Int. Cl.
  *G06T 7/80*     (2017.01)
  *G06T 7/90*     (2017.01)
  *H04N 17/02*    (2006.01)
  *H04N 9/04*     (2006.01)
  *G06T 7/11*     (2017.01)
  *G06T 7/174*    (2017.01)
  *G06T 15/50*    (2011.01)

(52) U.S. Cl.
  CPC ............. *G06T 15/506* (2013.01); *H04N 1/60* (2013.01); *H04N 1/6019* (2013.01); *H04N 5/3572* (2013.01); *H04N 9/045* (2013.01); *H04N 17/02* (2013.01); *G06T 2207/10024* (2013.01); *G06T 2207/10068* (2013.01); *G06T 2207/10152* (2013.01); *G06T 2207/30244* (2013.01)

(58) Field of Classification Search
  CPC . G06T 2207/10068; G06T 2207/10152; G06T 2207/30244; H04N 1/6019; H04N 5/3572; H04N 9/045; H04N 17/02; H04N 1/60
  See application file for complete search history.

(56) References Cited

U.S. PATENT DOCUMENTS

| | | | |
|---|---|---|---|
| 5,792,147 | A | 8/1998 | Evans et al. |
| 5,836,869 | A | 11/1998 | Kudo et al. |
| 6,047,088 | A | 4/2000 | van Beek et al. |
| 6,072,496 | A | 6/2000 | Guenter et al. |
| 6,449,103 | B1 | 9/2002 | Charles |
| 7,429,999 | B2 | 9/2008 | Poulin |
| 7,750,969 | B2 | 7/2010 | Sato |
| 7,751,865 | B2 | 7/2010 | Jascob |
| 7,808,525 | B2 | 10/2010 | Katayama |
| 7,892,165 | B2 | 2/2011 | Nakamura |
| 7,970,174 | B2 | 6/2011 | Goldbach |
| 8,223,193 | B2 | 7/2012 | Zhao |
| 8,771,177 | B2 | 7/2014 | Hale et al. |
| 8,902,232 | B2 | 12/2014 | Debevec et al. |
| 9,307,892 | B2 | 4/2016 | Dahmen |
| 9,367,928 | B2 | 6/2016 | de Almeida Barreto et al. |
| 9,398,840 | B2 | 7/2016 | Rehe |
| 9,438,897 | B2 | 9/2016 | Barreto et al. |
| 9,888,831 | B2 | 2/2018 | Yoshino |
| 9,986,183 | B2 | 5/2018 | Baek et al. |
| 2004/0019274 | A1 | 1/2004 | Galloway, Jr. et al. |
| 2004/0070565 | A1 | 4/2004 | Nayer et al. |
| 2004/0181149 | A1 | 9/2004 | Langlotz et al. |
| 2005/0047676 | A1* | 3/2005 | Kang ..................... G06T 5/50 382/274 |
| 2005/0085720 | A1 | 4/2005 | Jascob |
| 2005/0089199 | A1 | 4/2005 | Marschner et al. |
| 2005/0270375 | A1 | 12/2005 | Poulin |
| 2005/0280709 | A1 | 12/2005 | Katayama |
| 2005/0281465 | A1 | 12/2005 | Marquart et al. |
| 2006/0082546 | A1 | 4/2006 | Wey |
| 2006/0239345 | A1 | 10/2006 | Taubman et al. |
| 2008/0075324 | A1 | 3/2008 | Sato |
| 2008/0097156 | A1 | 4/2008 | Nakamura |
| 2008/0202509 | A1 | 8/2008 | Dillon et al. |
| 2008/0239327 | A1 | 10/2008 | Bryll |
| 2008/0269596 | A1 | 10/2008 | Revie et al. |
| 2008/0306490 | A1 | 12/2008 | Lakin et al. |
| 2010/0009314 | A1 | 1/2010 | Tardieu et al. |
| 2010/0039506 | A1 | 2/2010 | Sarvestani et al. |
| 2010/0245541 | A1 | 9/2010 | Zhao |
| 2010/0256504 | A1 | 10/2010 | Moreau-Gaudry et al. |
| 2011/0075922 | A1 | 3/2011 | Turner et al. |
| 2011/0115798 | A1 | 5/2011 | Nayar et al. |
| 2011/0130761 | A1 | 6/2011 | Plaskos et al. |
| 2012/0078049 | A1 | 3/2012 | Pauli et al. |
| 2012/0120255 | A1 | 5/2012 | Cao et al. |
| 2013/0034203 | A1 | 2/2013 | Wang et al. |
| 2013/0123801 | A1 | 5/2013 | Umasuthan et al. |
| 2013/0150863 | A1 | 6/2013 | Baumgartner |
| 2013/0281821 | A1 | 10/2013 | Liu et al. |
| 2014/0022248 | A1 | 1/2014 | Kuffner, Jr. et al. |
| 2014/0031668 | A1 | 1/2014 | Mobasser et al. |
| 2014/0035893 | A1* | 2/2014 | Jackson ............... H04N 9/3147 345/207 |
| 2014/0107471 | A1 | 4/2014 | Haider et al. |
| 2014/0236159 | A1 | 8/2014 | Haider et al. |
| 2014/0285676 | A1 | 9/2014 | Barreto et al. |
| 2014/0327796 | A1* | 11/2014 | Lin ..................... H04N 5/2351 348/254 |
| 2015/0065799 | A1 | 3/2015 | Hale et al. |
| 2015/0254872 | A1 | 9/2015 | Barreto et al. |
| 2015/0297177 | A1 | 10/2015 | Boctor et al. |
| 2016/0000518 | A1 | 1/2016 | Thoranaghatte |
| 2016/0148435 | A1 | 5/2016 | Li et al. |
| 2016/0161602 | A1* | 6/2016 | Prokhorov ............ G01S 7/4972 702/97 |
| 2016/0183841 | A1 | 6/2016 | Duindam et al. |
| 2016/0191887 | A1 | 6/2016 | Casas |
| 2016/0220099 | A1 | 8/2016 | Schouwink et al. |
| 2016/0324580 | A1 | 11/2016 | Esterberg |
| 2017/0325669 | A1 | 11/2017 | Levy |
| 2018/0049622 | A1 | 2/2018 | Ryan et al. |
| 2018/0071032 | A1 | 3/2018 | de Almeida Barreto |

FOREIGN PATENT DOCUMENTS

| | | |
|---|---|---|
| EP | 3130276 A1 | 2/2017 |
| WO | 2009042644 A2 | 4/2009 |
| WO | 2013015699 A1 | 1/2013 |
| WO | 2013052187 A2 | 4/2013 |
| WO | 2014054958 A2 | 4/2014 |
| WO | 2014122301 A1 | 8/2014 |
| WO | 2016154557 A1 | 9/2016 |
| WO | 2016168307 A1 | 10/2016 |

OTHER PUBLICATIONS

Ng et al. ("Using Geometry Invariants for Camera Response Function Estimation," IEEE CVPR 2007) (Year: 2007).*
Lin et al. ("Radiometric calibration from a single image," Proceedings of the 2004 IEEE Computer Society Conference on Computer Vision and Pattern Recognition) (Year: 2004).*
Qiu et al. ("Estimation method of CCD and CMOS response functions based on a single image," International Conference on Optical Instruments and Technology: Optoelectronic Imaging and Process Technology, Proc. SPIE. 7513, 2009) (Year: 2009).*
Chen et al. ("A Theoretical Analysis of Camera Response Functions in Image Deblurring," European Conference on Computer Vision, 2012) (Year: 2012).*
Hamey ("Simultaneous Estimation of Camera Response Function, Target Reflectance and Irradiance Values," DICTA 2005: 9) (Year: 2005).*
Zheng et al. ("Single-Image Vignetting Correction," IEEE Transactions on Pattern Analysis and Machine Intelligence, vol. 31, No. 12, Dec. 2009) (Year: 2009).*
Yu ("Practical anti-vignetting methods for digital cameras," IEEE Transactions on Consumer Electronics, vol. 50, No. 4, 2004) (Year : 2004).*

(56) References Cited

OTHER PUBLICATIONS

Kim, Dong Sik et al.; "Joint Optimization of Spatial Registration and Histogram Compensation for Microscopic Images"; Conference Proceedings: Annual International Conference of the IEEE Engineering in Medicine and Biology Society; pp. 3779-3782; Aug. 30, 2006.
Fitzgibbon, A.W.; "Simultaneous Linear Estimation of Multiple View Geometry and Lens Distortion;" Proceedings of the 2001 IEEE Computer Society Conference on Computer Vision and Pattern Recognition; CVPR 2001, vol. 1, pp. 1-8, Jan. 1, 2001.
Song, KS et al. "Region Adaptive Correction Method for Radial Distortion of Fish-Eye Image;" Image Processing: Algorithms and Systems X; and Parallel Processing for Imaging Applications II, SPIE, vol. 8295, No. 1., pp. 1-7, Feb. 9, 2012.
Kim, Seon Joo et al.; "Joint Feature Tracking and Radiometric Calibration from Auto-Exposure Video"; Computer Vision, 2007, pp. 1-8, Oct. 1, 2007.
Carr, Peter et al.; "Point-less Calibration: Camera Parameters from Gradient-Based Alignment to Edge Images"; Applications of Computer Vision (WACV), pp. 377-384, Jan. 9, 2012.
PCT International Search Report in International Application No. PCT/PT2016/027299 dated Jul. 26, 2016.
Bruce D. Lucas and Takeo Kanade. An Iterative Image Registration Technique with an Application to Stereo Vision; In DARPA Image Understanding Workshop, pp. 121-130, Apr. 1981.
Simon Baker and Iain Matthews. Equivalence and Efficiency of Image Alignment Algorithms. In IEEE Conf. Vis. Patt. Recogn., vol. 1, pp. 1090-1097, Dec. 2001.
Simon Baker and Iain Matthews. Lucas-kanade 20 years on: A unifying framework. 'Int. J. Comput. Vis.', 56(3):221-255, Mar. 2004.
Jianbo Shi and C. Tomasi. Good features to track. In IEEE Conf. Vis. Patt. Recogn., pp. 593 600, Jun. 1994.
Myung Hwangbo, Jun-Sik Kim, and Takeo Kanade. Gyro-aided feature tracking for a moving camera: fusion, auto-calibration and GPU implementation. Int. J. of Robot. Res., 30(14):1755-1774, Dec. 2011.
Jean-Yves Bouguet. Pyramidal Implementation of the Lucas Kanade Feature Tracker Description of the algorithm, 2000.
L. Matthews, T. Ishikawa, and S. Baker. The Template Update Problem. IEEE Trans. Patt. Anal. Mach. Intell., 26 (6):810-815, Jun. 2004.
Reg G. Willson and Steven A. Shafer. What is the center of the image? J. Opt. Soc. Am. A, 11(11):2946-2955, Apr. 1993.
Joao P. Barreto. A Unifying Geometric Representation for Central Projection Systems. Comput. Vis. Imag. Unders., 103(3):208-217, Jun. 2006.
Joao P. Barreto, Jose Roquette, Peter Sturm, and Fernando Fonseca. Automatic Camera Calibration Applied to Medical Endoscopy. In Brit. Mach. Vis. Conf., Sep. 2009.
M. Menem, "Constraints on perspective images and circular panoramas," BMVC, Sep. 2004.
D. Claus and A. Fitzgibbon, "A Rational Function lens distortion model for general cameras," Computer Vision and Pattern Recognition IEEE Computer Society Conference on , pp. 213-219, vol. 1, Jun. 2005.
Bill Triggs, Philip F. McLauchlan, Richard I. Hartley, and Andrew W. Fitzgibbon. Bundle adjustment—a modern synthesis. In Proceedings of the International Workshop on Vision Algorithms: Theory and Practice, ICCV '99, pp. 298-372, London, UK, Springer-Verlag, 2000.
Greg Welch and Gary Bishop. An Introduction to the Kalman Filter. Technical report, University of North Carolina at Chapel Hill, Chapel Hill, N.C., USA, 1995; updated Jul. 2006.
Simon Baker, Daniel Scharstein, J. P. Lewis, Stefan Roth, Michael J. Black, and Richard Szeliski. A database and evaluation methodology for optical flow. Int. J. Comput. Vision, 92(1), Dec. 2011.
Steffen Gauglitz, Tobias Hollerer, and Matthew Turk. Evaluation of Interest Point Detectors and Feature Descriptors for Visual Tracking. Int. J. Comput. Vis., 94(3):335-360, Mar. 2011.

K. Daniilidis, A. Makadia, and T. Bulow. Image Processing in Catadiop-tric Planes: Spaciotemporal Derivatives and Optical Flow Computation. In Int. Workshop on Omndirectional Vision, Jun. 2002.
M. Lourenco, J. P. Barreto, and F. Vasconcelos. sRD-SIFT: Keypoint Detection and Matching in Images With Radial Distortion. IEEE Trans Robotics, Jun. 2012.
P. Sturm, S. Ramalingam, J.-P. Tardif, S. Gasparini and J. Barreto, Camera Models and Fundamental Concepts Used in Geometric Computer Vision. Now Publishers, Inc., Jan. 2011.
David Nistér. An Efficient Solution to the Five-Point Relative Pose Problem. IEEE Trans. Patt. Anal. Mach. Intell., 26, Jun. 2004.
R. Melo, J.P. Barreto, and G. Falcao. A new solution for camera calibration and real-time image distortion correction in medical endoscopy-initial technical evaluation. Biomedical Engineering, IEEE Transactions on, 59(3):634-644, Mar. 2012.
Alper Yilmaz, Omar Javed, and Mubarak Shah. Object Tracking: A survey. ACM Comput. Surv., 38, Dec. 2006.
Marc Pollefeys, Luc Van Gool, Maarten Vergauwen, Frank Verbiest, Kurt Cornelis, Jan Tops, and Reinhard Koch. Visual Modeling with a Hand-Held Camera. Int. J. Comput. Vis., 59(3):207-232, Sep. 2004.
P. Baker, C. Fermuller, Y. Aloimonos, and R. Pless. A Spherical Eye from Multiple Cameras (Makes Better Models of the World). In IEEE Conf. Vis. Patt. Recogn., Feb. 2001.
Peter Hansen, Peter Corke, and Wageeh Boles. Wide-Angle Visual Feature Matching for Outdoor Localization. Int. J. of Robot. Res., 29:267-297, Feb. 2010.
Darius Burschka, Ming Li, Russell H. Taylor, and Gregory D. Hager. Scale-Invariant Registration of Monocular Endoscopic Images to CT-Scans for Sinus Surgery. In Med. Image Comput. and Computer-Assist. Inter., Sep. 2004.
Alexander Behrens, Michael Bommes, Thomas Stehle, Sebastian Gross, Steffen Leonhardt, and Til Aach. Real-time image composition of bladder mosaics in fluorescence endoscopy. Computer Science—Research and Development, 26:51-64, Feb. 2011.
Kevin Koeser, Bogumil Bartczak, and Reinhard Koch. Robust GPU-assisted camera tracking using free-form surface models. Journal of Real-Time Image Processing, 2(2):133-147, Oct. 2007.
T. Brox and J. Malik. Large displacement optical flow: descriptor matching in variational motion estimation. IEEE Trans. Patt. Anal. Mach. Intell., 33(3):500-513, Mar. 2011.
Miguel Lourenco and Joao P. Barreto. Tracking features in uncalibrated images with radial distortion. In Eur. Conf. Comput. Vis., pp. 1-14, Oct. 2012.
C. Mei, S. Benhimane, E. Malis, and P. Rives. Efficient Homography-based Tracking and 3D Reconstruction for Single Viewpoint Sensors. IEEE Trans Robotics, Dec. 2008.
A. Rav-Acha and S. Peleg. Lucas-Kanade without Iterative Warping. In IEEE Int. Conf. Image Process., pp. 1097-1100, Oct. 2006.
C. Mei, S. Benhimane, E. Malis, and P. Rives. Constrained multiple planar template tracking for central catadioptric cameras. In British Machine Vision Conference, Sep. 2006.
A. Salazar-Garibay, E. Malis, and C. Mei. Visual tracking of planes with an uncalibrated central catadioptric camera. In IROS, Mar. 2009.
Toru Tamaki, Tsuyoshi Yamamura, and Noboru Ohnishi. Unified approach to image distortion. In ICPR, pp. 584-587, Aug. 2002.
Y. Chang, "Multi-view 3D Reconstruction for Scenes Under the Refractive plane with known vertical direction," Computer Vision (ICCV), Nov. 2011.
T. Yamaguchi, M. Nakamoto, Y. Sato, Y. Nakajima, K. Konishi, M. Hashizume, T. Nishii, N. Sugano, H. Yoshikawa, K. Yonenobu, and S. Tamura, "Camera Model and Calibration Procedure for Oblique—Viewing Endoscope," in MICCAI, pp. 373-381, Nov. 2003.
C. Wu, B. Jaramaz, and S. G. Narasimhan, "A Full Geometric and Photometric Calibration Method for Oblique-viewing Endoscope," International Journal of Computer Aided Surgery, vol. 15, pp. 19-31, Apr. 2010.
N. Fukuda, Y. Chen, M. Nakamoto, and T, "A scope cylinder rotation tracking method for oblique-viewing endoscopes without attached sensing device," Software Engineering and Data Mining, No. 1, pp. 684-687, Jun. 2010.

(56) References Cited

OTHER PUBLICATIONS

J. Barreto, J. Santos, P. Menezes, and F. Fonseca, "Ray-based Calibration of Rigid Medical Endoscopes," in OMNIVIS, Sep. 2008.
B. Chapman, G. Jost, and R. Van Der Pass, Using OpenMP: Portable Shared Memory Parallel Programming (Scientific Computation and Engineering Series). The MIT Press, 2008.
M. A. Fischler and R. C. Bolles, "Random Sample Consensus: A Paradigm for Model Fitting with Applications to Image Analysis and Automated Cartography," Commun. ACM, vol. 24, No. 6, pp. 381-395, Jun. 1981.
A. Agrawal, Y. Taguchi, and S. Ramalingam, "Analytical forward projection for axial non-central diotropic and catadioptric cameras," presented at the ECCV'10: Proceedings of the 11th European Conference on Computer Vision: Part III, Sep. 2010.
W. Smith, N. Vakil, and S. Maislin, "Correction of Distortion in Endoscope Images," IEEE Transactions on Medical Imaging, vol. 11, No. 1, pp. 117-122, Mar. 1992.
Li, X., et al., "Symmetry and Template Guided Completion of Damaged Skulls", Computers & Graphics, vol. 35, pp. 885-893, Jan. 31, 2011.
Mitra, Niloy J., et al., "Registration of Point Cloud Data from a Geometric Optimization Perspective", Eurographics Symposium on Geometry Processing, pp. 23-32, 2004.
K. Vijayan-Asari, S. Kumar, and D. Radhakrishnan, "A new approach for nonlinear distortion correction in endoscopic images based on least squares estimation," IEEE Transactions on Medical Imaging, vol. 18, No. 4, pp. 345-354, Apr. 1999.
J. Helferty, C. Zhang, G. McLennan, and W. Higgins, "Videoendoscopic distortion correction and its application to virtual guidance of endoscopy," IEEE Transactions on Medical Imaging, vol. 20, No. 7, pp. 605-617, Jul. 2001.
Kalman, R.E.; A New Approach to Linear Filtering and Prediction Problems; ASME—Journal of Basic Engineering, 82 (Series D): 35-45; Mar. 1960.
T. Stehle, M. Hennes, S. Gross, A. Behrens, J. Wulff, and T. Aach, "Dynamic Distortion Correction for Endoscopy Systems with Exchangeable Optics," in Bildverarbeitungfür die Medizin 2009. Berlin: Springer, pp. 142-146, 2009.
J.-Y. Bouguet. Camera Calibration Toolbox for Matlab. [Online]. Available: http://www.vision.caltech.edu/bouguetj/calibdoc/index.html#ref; Last Updated Oct. 14, 2015.
Z. Zhang, "Flexible camera calibration by viewing a plane from unknown orientations," in ICCV, pp. 666-673, Sep. 1999.
R. Shahidi, M. Bax, C. Maurer, J. Johnson, E. Wilkinson, B. Wang, J. West, M. Citardi, K. Manwaring, and R. Khadem, "Implementation, calibration and accuracy testing of an image-enhanced endoscopy system,"IEEE Transactions on Medical Imaging, vol. 21, No. 12, pp. 1524-1535, Dec. 2002.
C. Wengert, M. Reef f, P. Cattin, and G. Sz'ekely, "Fully automatic endoscope calibration for intraoperative use," in Bildverarbeitungfür die Medizin 2006, pp. 419-423, Mar. 2006.
J. Mallon and P. F. Whelan, "Which pattern? Biasing aspects of planar calibration patterns and detection methods," Pattern Recognition Letters, vol. 28, No. 8, pp. 921-930, Jan. 2007.
S. D. Buck, F. Maes, A. D'Hoore, and P. Suetens, "Evaluation of a novel calibration technique for optically tracked oblique laparoscopes," Proceedings of the 10th international conference on Medical image computing and computer-assisted intervention—vol. Part I, pp. 467-474, Feb. 2007.
A. Fitzgibbon, M. Pilu, and R. Fisher, "Direct least square fitting of ellipses," IEEE Transactions on Pattern Analysis and Machine Intelligence, vol. 21, No. 5, pp. 476-480, May 1999.
Jalobeanu et al. "Modeling Images of Natural 30 Surfaces: Overview and Potential Applications"; IEEE; Publication [online]. Jun. 2004. [retrieved Jun. 24, 2016]. Retrieved from the Internet: <URL: http://citeseerx.ist.psu.edu/vlewdoc/download?doi=10.1.1.59.1141&rep=rep1&type=pdf>; pp. 1-9.
Supplementary European Search Report based on EP 16769785 dated Oct. 26, 2018.
USPTO Office Action in U.S. Appl. No. 15/561,666 dated Mar. 27, 2019.

\* cited by examiner

|    | Camera      | Mount   | Lens                | Light    |
|----|-------------|---------|---------------------|----------|
| R1 | Sentech     | no zoom | Dyonics arthroscope | lens tip |
| R2 | Sentech     | no zoom | Dyonics arthroscope | lamp     |
| R3 | Flea        | zoom    | Dyonics laparoscope | lens tip |
| R4 | Grasshopper | -       | Stryker arthroscope | lamp     |
| R5 | Flea        | zoom    | Dynoics arthroscope | sunlight |
| R6 | Flea        | zoom    | Dynoics arthroscope | lens tip |

FIG. 5

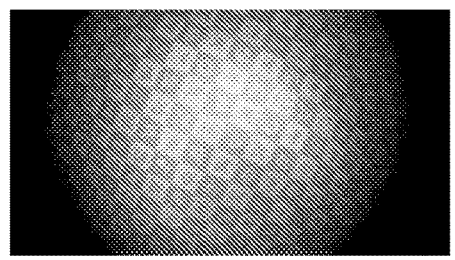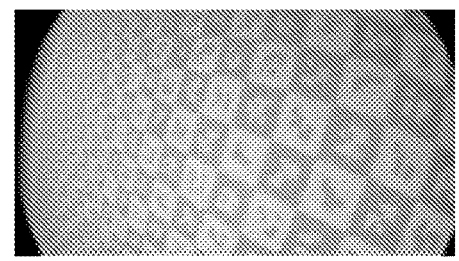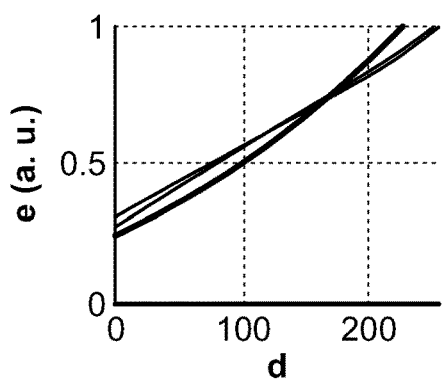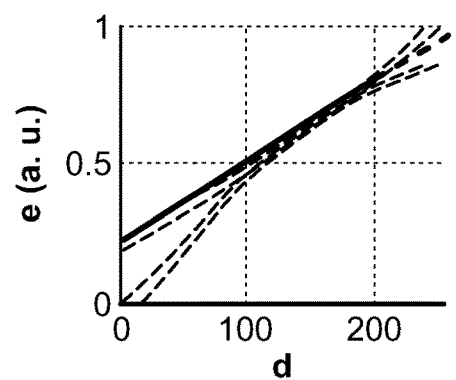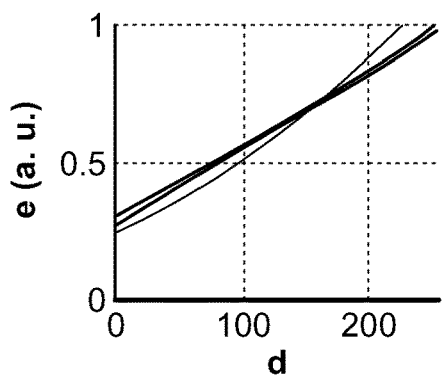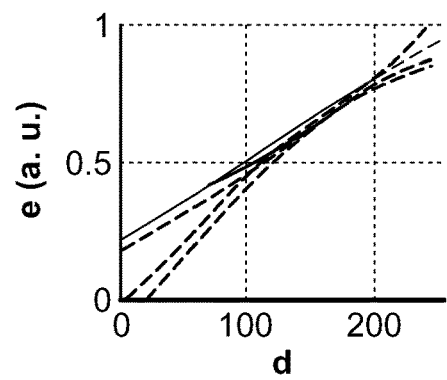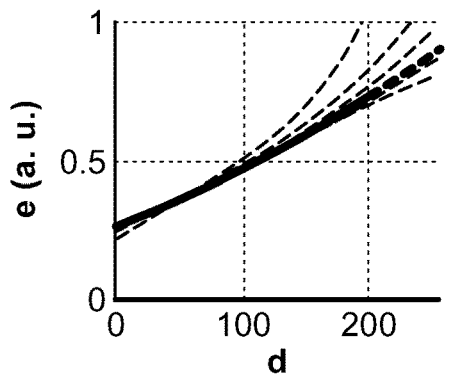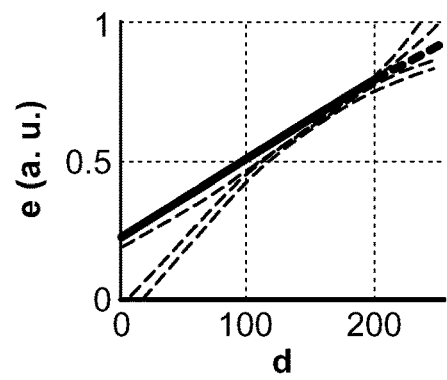
FIG. 6A        FIG. 6B

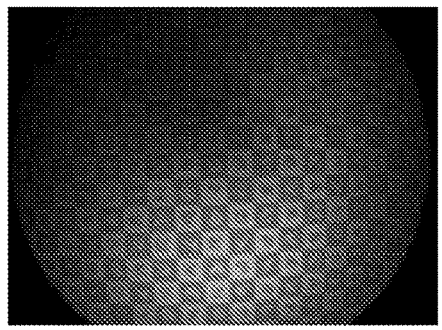
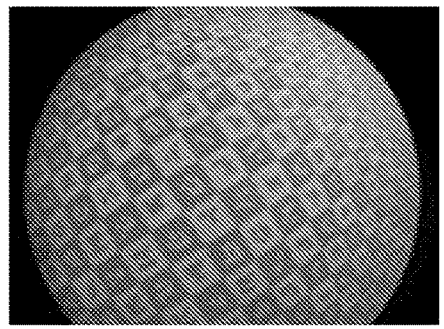
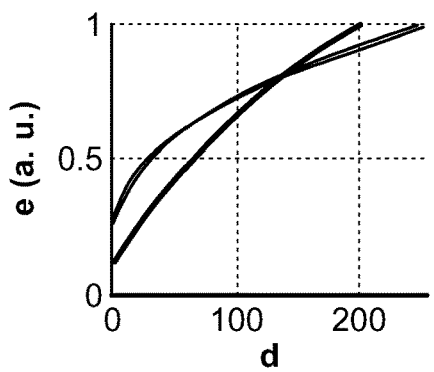
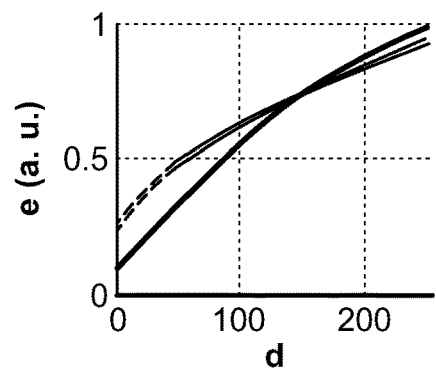
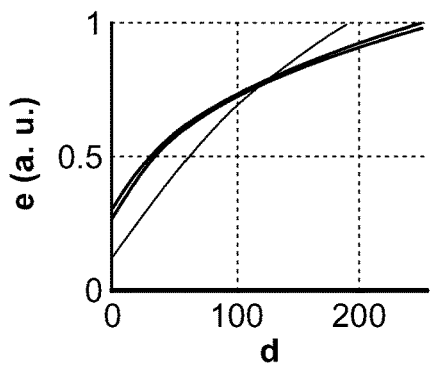
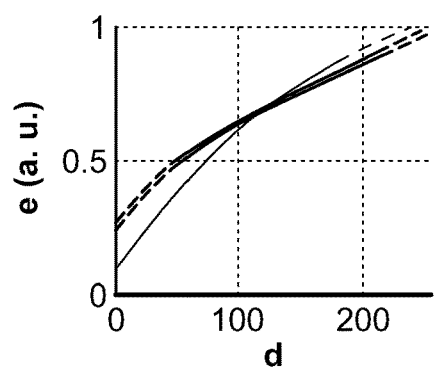
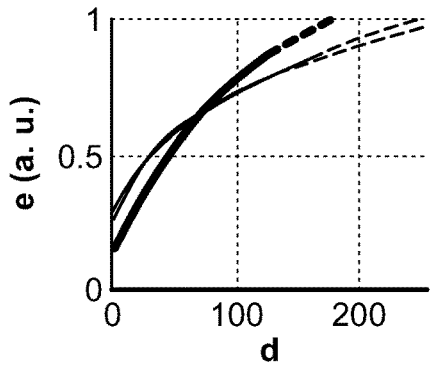
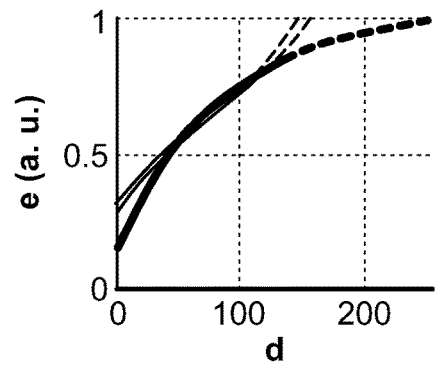
FIG. 6C
FIG. 6D

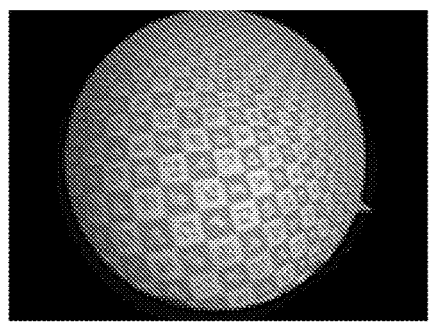
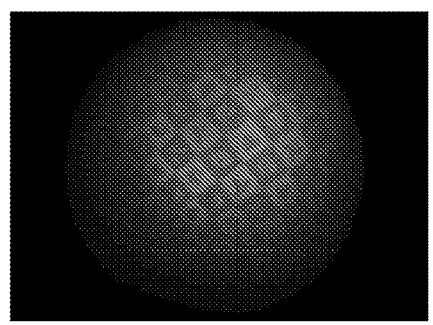
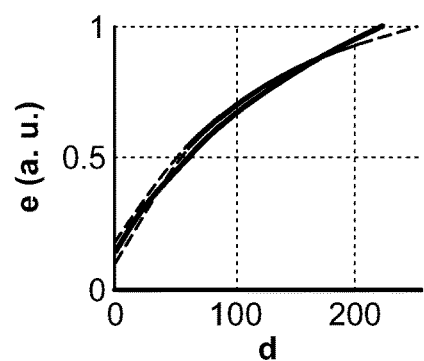
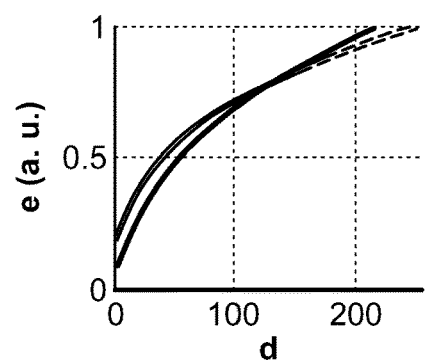
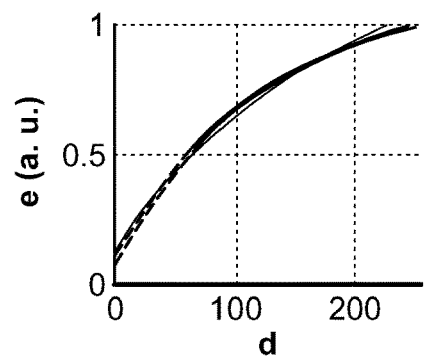
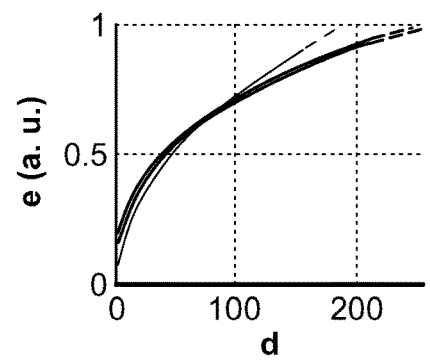
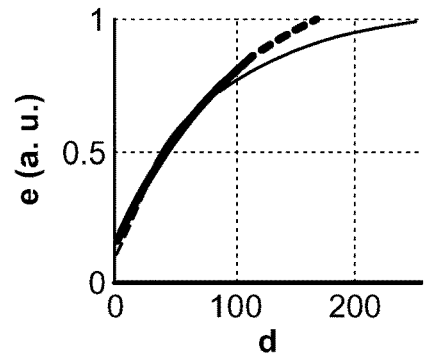
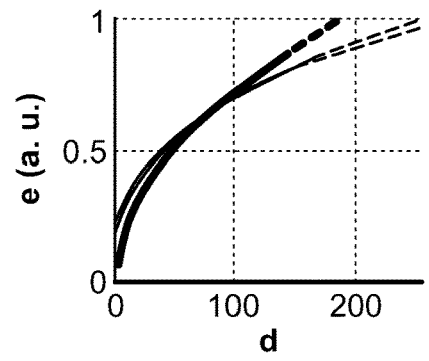
FIG. 6E
FIG. 6F

METHODS AND SYSTEMS FOR CAMERA CHARACTERIZATION IN TERMS OF RESPONSE FUNCTION, COLOR, AND VIGNETTING UNDER NON-UNIFORM ILLUMINATION

CROSS-REFERENCE AND CLAIM OF PRIORITY TO RELATED APPLICATIONS

This patent application is a U.S. national phase application of PCT International Patent Application No. PCT/US2016/027299, filed on Apr. 13, 2016, which claims priority to and the benefit of U.S. Provisional patent application No. 62/146,643, filed on Apr. 13, 2015 and titled "Methods and Systems for Estimating Camera Response Function and Vignetting under Non-Uniform Illumination", all of which are hereby incorporated by reference in their entireties.

STATEMENT REGARDING FEDERALLY SPONSORED RESEARCH OR DEVELOPMENT

Not applicable.

FIELD

The disclosure generally relates to the field of camera radiometric calibration and color characterization in setups with generic illumination, such as medical endoscopic cameras and smartphone cameras at close range. Specifically, but not by way of limitation, presently disclosed embodiments include a camera characterization procedure that estimates a camera response function and, optionally, a camera color mapping, using a minimum of one calibration image acquired under generic illumination, and estimates a camera vignetting using a minimum of two calibration images acquired from the same viewpoint with slightly different illumination, which is carried out without making prior assumptions about the illuminant, the shapes of the camera response function, or the particular shape of the vignetting function. The disclosed embodiments also include a method that, with an additional pair of images from another viewpoint, performs the estimation of the vignetting function and does not require any assumption on its shape.

BACKGROUND

In minimally invasive medical procedures (MIP), the doctor executes the clinical action of surgery or diagnosis based exclusively in the video acquired by a small endoscopic camera that is inserted in the targeted anatomical cavity. Such procedures are prone to errors and difficult to execute, with the surgeons having to undergo a long training period until mastering the surgical technique. In this context, improving visualization conditions and developing systems for assisting the doctor during the procedures is of importance to decrease clinical errors and to reduce the surgeon learning curve.

In most cameras, the relation between incident light and the image digitized values is nonlinear. Endoscopic cameras are no exception with such non-linearity being either due to limitations in camera/optics manufacturing, or used intentionally for compressing the spectral range of the sensors. The camera response function (CRF) models in part this non-linear relation by describing how (physically meaningful) incoming light is mapped to quantized image brightness values. Color characterization, i.e., estimation of the camera color mapping (CCM), also plays a big role in modelling a camera and needs to be accounted for to provide an accurate estimation of the CRF and to perform color standardization across cameras. To fully describe radiometrically for the camera, one needs to also account for vignetting. This effect is an attenuation of the light signal caused by the camera optics. It is present in many consumer cameras and more predominantly in MIP cameras and contributes to a poor image/video quality.

Calibration of the color model of the imaging device, comprising the CRF and the CCM, can be useful in many ways in the context of MIP. Since the color of organs and tissues is a cue in many diagnosis procedures, fidelity in color visualization is of key importance. Thus, the estimated camera model can be used in an image post-processing stage for the purpose of color constancy and white-balance, e.g., invariance of color to different illumination, lenses, and cameras. The CRF estimation may be a step for deblurring and is a crucial pre-processing step for the application of photometric vision algorithms, for example with the purpose of developing systems of computer-aided surgery (CAS). Reconstruction methods like shape-from-shading or photometric stereo assume a linear (or affine) mapping between physical scene radiance and image brightness, and such techniques are becoming increasingly popular in CAS as a way of performing 3D modelling of deformable surfaces. Vignetting compensation also has a major role in these applications as most existing algorithms for shape-from-shading or photometric stereo assume that no vignetting is present.

CRF estimation is a classical problem in computer vision with several different methods described in the literature. However, the camera characterization of medical endoscopes poses specific challenges that are not properly addressed by the current state-of-the-art. First, the anatomical cavity is illuminated via a light guide that runs along the endoscope, which means that we can neither consider a far light source, nor a light source coincident with the optical center. It is a situation of near-light source for which the vast majority of CRF estimation methods are not applicable. Moreover, the light source can hardly be considered punctual or isotropic (see FIG. 1). Thus, since the shape and format of the distal tip of the light guide varies across endoscopes, it is desirable to carry the characterization without making assumptions about illumination conditions. Second, since in MIP the lens scope is mounted on the camera-head immediately before starting the intervention, the calibration procedure should be fast, robust, and require minimal user intervention in order to be carried by the surgeon in the operating room (OR) without disturbing the existing clinical routine. It would also be advantageous to incorporate such camera characterization method with a method for geometric camera calibration that requires a single image of a checkerboard pattern acquired from a generic pose. There may be no similar solution for camera characterization that addresses this important usability requirement (as discussed below, single-image methods do not apply to medical endoscopes).

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed below.

Disclosed herein is a method for estimating the CRF and, optionally, the CCM, from a single frame and for estimating the camera vignetting with a second same-pose image with different light intensity.

The CRF estimation is performed on a generic smooth surface of at least two albedos. Having segmented the regions of each albedo, the albedo-normalized irradiance is used to explore the ratios between the two regions on its isocurves.

The CCM estimation is performed on a generic smooth surface of at least the same number of albedos as the number of channels in the calibration image, where the albedos values are known and the same calibration image can be used for both the CRF and CCM estimation.

The estimation of camera vignetting requires the acquisition of a second image with a different intensity of the near-light. By exploring the relation between the two images, a model up-to-scale of the vignetting with two unknowns is created. This approach uses no model for the near-light, and if two additional images with a different pose are available, it may not assume shape of the vignetting, as most approaches do.

Such calibration is of major importance for many applications, from color constancy to 3-D reconstruction.

In one embodiment, a method for estimating a color model of an imaging device, comprised of the response function and the color mapping, under generic illumination, the method comprising: (i) acquiring at least one calibration image of a scene with at least two regions of constant albedo from an arbitrary pose; (ii) segmenting the calibration image into regions of constant albedo and grouping the pixels in each region into a set $\mathcal{A}_{\rho_R}$, the set of points with albedo $\rho_n$; (iii) deriving equations for the estimation using $$f^{-1}(d(x))=u(x)\rho'(x)$$

where x are the pixel coordinates that correspond to a scene point, d(x) is the acquired image and is defined as a vector of $N_c$ elements $d_c(x)$ that correspond to values on pixel x and channel c, $f^{-1}(d)$ is the inverse camera response function, a function vector of elements $f_c^{-1}(d_c)$, u(x) is the albedo-normalized irradiance, a scalar function, $\rho=M\rho'$ is the albedo vector of size $N_s$ in the output color space and is defined by elements $\rho_s$ for each channel s, $\rho'$ is the albedo vector of size $N_c$ in the color space of the camera and is defined by elements $\rho'_c$ for each channel c, and M is a color mapping matrix of size $N_s$ by $N_c$ and composed of rows $m_s^T$; (iv) finding a solution for the color model of the imaging device, with the equations created in step iii.

In another embodiment, a method for estimating a vignetting model of the imaging device by: (i) acquiring at least one set of at least two calibration images with the same relative pose and a different intensity of the near-light source; (ii) segmenting the calibration images into regions of constant albedo; (iii) computing the albedo-normalized irradiance for each pair of same-pose images, $u_1(x)$ and $u_2(x)$; (iv) deriving the equations of the vignetting model using $$m(x)=k_1u_1(x)+k_2u_2(x)$$

where $k_1$ and $k_2$ are the two model unknowns; (v) finding a solution for the vignetting model with the equations created in step iv.

Another embodiment, an apparatus comprising: a calibration object comprising a generic smooth surface with regions of two or more distinct albedos that can be segmented and identified in the acquired image; and an imaging processing system to which the camera can be connected, wherein the imaging processing system comprises: a processor coupled to a non-transitory computer readable medium, wherein the non-transitory computer readable medium comprises instructions when executed by the processor causes the imaging processing system to acquire and capture the image.

A more complete understanding of the presently disclosed embodiments will be appreciated from the description and accompanying figures and claims, which follow.

BRIEF DESCRIPTION OF THE DRAWINGS

The accompanying drawings, which are included to provide a deeper understanding of the invention and are incorporated in and constitute a part of this application, illustrate embodiment(s) of the invention and together with the description serve to explain the principle of the invention. In the drawings:

FIG. 1C shows an example of a photograph of the endoscope tip with the light on.

FIG. 5 is an example table that provides a description of the camera set-ups used on the acquired datasets.

FIG. 6A, FIG. 6B, FIG. 6C, FIG. 6D, FIG. 6E, and FIG. 6F show on each column an example of a checkerboard grid image acquired with the respective rig, and the resulting camera response functions for the red, green, and blue channels (from top to bottom). Each plot shows the result for the Wu et al. approach, an approach that uses 24 same-pose images, in color, and the results for five checkerboard images using our approach. The dashed segment of the curves is the extrapolated regions.

DETAILED DESCRIPTION

It should be understood that, although an illustrative implementation of one or more embodiments are provided below, the various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. Furthermore, the disclosure may be modified within the scope of the appended claims along with their full scope of equivalents.

A two-phase process to characterize the color model of a camera, comprising the radiometric and colorimetric properties, is disclosed. A method for estimating the CRF from a single image of a surface with regions of two or more colors is disclosed, which can optionally estimate the CCM if the surface has the same or more colors than the number of channels in the calibration image. The algorithm makes no assumptions about the illumination conditions or the vignetting. The algorithm may be implemented after capturing an image and/or simultaneously while receiving a live video feed or in real-time. Also disclosed is a method to estimate the vignetting under near-lighting without modelling the light source from a pair (or more) of two same-pose images.

Figure 1A:
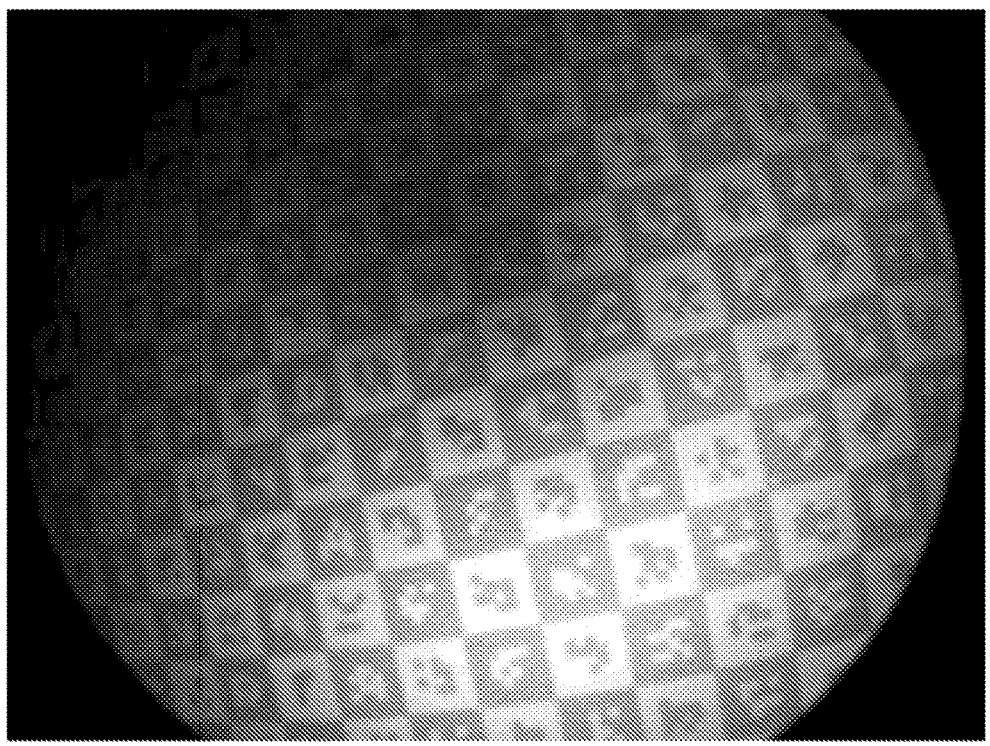
FIG. 1A shows an example of the calibration grid imaged with an endoscopic camera (a).

Although the shape of the calibration surface can be generic to some extent, the experiments are carried out using a planar checkerboard target (see FIG. 1A). The reasons are twofold: the automatic segmentation and identification of the color regions is straightforward, and by combining our calibration method with the geometric calibration approach, it is possible to have both calibrations from a single calibration frame, and the vignetting model with only an additional frame, which can be used to improve our calibration and the geometric calibration.

Figure 1B:
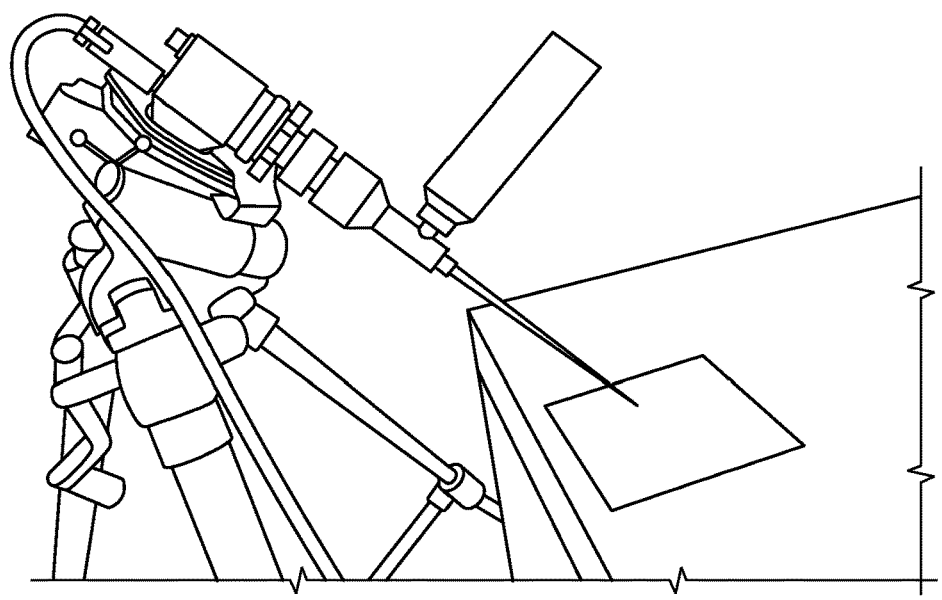
FIG. 1B shows an example of a minimal invasive procedure camera rig performing the radiometric calibration.
Figure 1C:
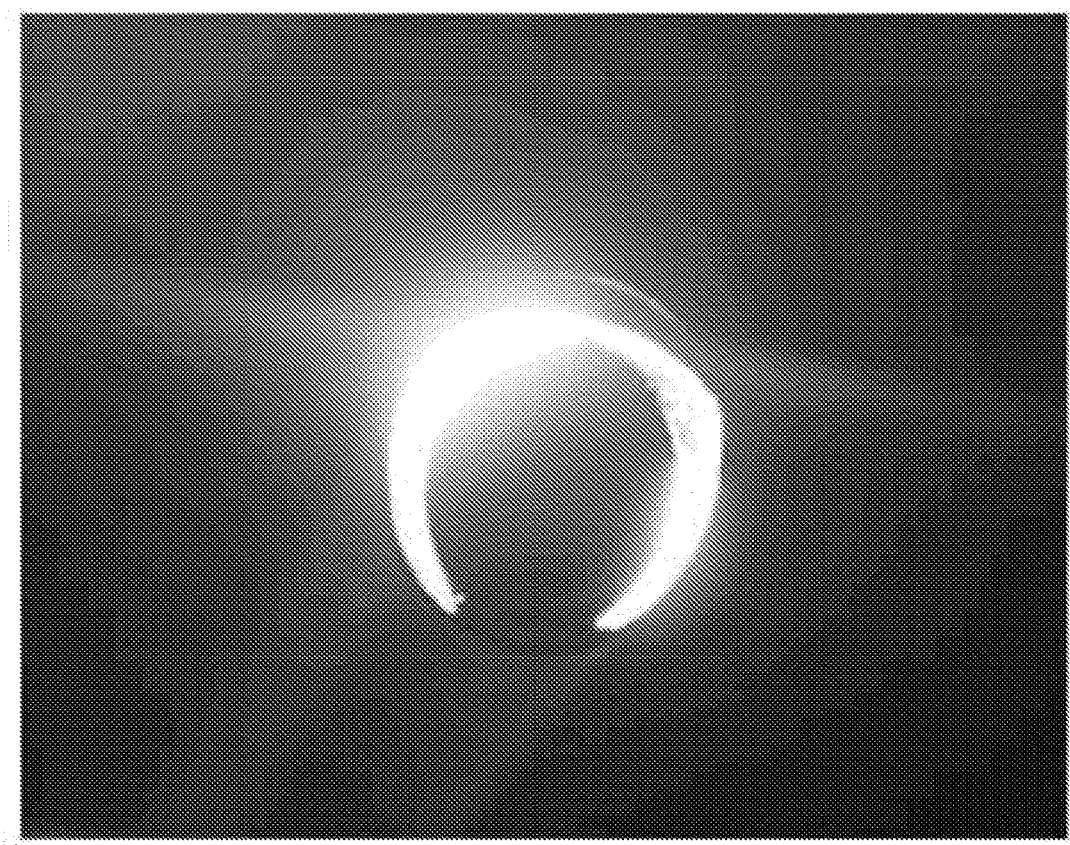

The color model estimation method is not only able to cope with the specific requirements of a MIP set-up (see FIG. 1B), e.g., non-uniform non-punctual illumination (FIG. 1C) and uncommon vignetting, but also suitable for more generic set-ups, such as smart-phone cameras and in-door calibration. Calibration for other generic illumination, such as distant lighting, can also be achieved with a calibration scene of more albedos.

While the applicability of the vignetting estimation method is more limited as it requires a second same-pose image, vignetting estimation contributes for color model estimation of the camera under a generic near-light (with variable intensity), for which no solution was available in the literature.

1. Formulation and Overview

The radiometric image formation model can be written as $$d(x)=f(\alpha e(x)) \quad (1)$$

where $d(x)$ is the map of imaged/stored values (i.e., the actual image or frame) and is an $N_c$-element vector, $N_c$ is the number of channels in the acquired image, x are the pixel coordinates that correspond to a scene point, and $e(x)$ is the sensor/image irradiance. f is the CRF, a monotonically increasing curve, and $\alpha$ is the exposure, a combination of sensor gains, shutter time, and aperture. The sensor irradiance is given by $$e(x)=m(x)I(x) \quad (2)$$

with $m(x)$ being the vignetting (natural, optical, mechanical, and pixel vignetting) and other spatial attenuation effects related to the imaging system, and $I(x)$ the scene radiance. A generic model of the scene radiance can be written as $$I(x)=\rho'(x)q(x) \quad (3)$$

where $\rho'(x)$, an k-element vector, is the albedo as obtained by the camera spectral sensitivity and under the scene specific light spectrum, and $q(x)$ is the light intensity on the scene. And, since f is invertible, to facilitate the estimation, the above equations may be rewritten as $$f^{-1}(d(x))=\alpha m(x)q(x)\rho'(x) \quad (4)$$

giving the irradiance as a function of the image, where $f^{-1}(d)$ is function vector of elements $f_c^{-1}(d_c)$, which for and RGB camera is $f^{-1}(d)=(f_R^{-1}(d_R),f_G^{-1}(d_G),f_B^{-1}(d_B))^T$. Let the sensor irradiance be written as $$f^{-1}(d(x))=u(x)\rho'(x) \quad (5)$$

where $u(x)$ is composed of exposure, vignetting, and the light effect on the scene. Throughout the following sections the disclosure will call this function albedo-normalized irradiance (ANI).

To introduce color characterization in the camera model, one can describe the albedos of the color space of the camera in a standard color space such as CIEXYZ or sRGB by introducing a matrix M of size $N_s$ by $N_c$, $$Mf^{-1}(d(x))=u(x)\rho(x) \quad (6)$$

where $N_s$ is the number of channels in the standard color space, and $\rho$ is now in a standard color space and is an $N_s$-element vector. Note that if M is diagonal, we are back in the case of equation (5) as the scale factors can be absorbed by the CRF because it is defined up-to-scale.

Possible values for $N_c$ are: $N_c=3$ for trichromatic imaging devices, $N_c=1$ for monochromatic imaging devices, and usually $N_c>3$ for multispectral and hyperspectral imaging devices. Usually $N_s=N_c$, in which the output color space has the same number of channels as the calibration image.

2. Response Function and Color Mapping Estimation

The estimation of the CRF and the CCM may be done either jointly or separately (two-step optimization) by slightly different modifications to the optimization scheme. However, they are both based on equations derived from (6).

2.1 Assumptions

The proposed approach may be based on the assumption that we have a scene of a two-color (at least) Lambertian (as much as possible) surface.

In the present work, we have used a planar CALTag grid of at least two colors (see FIG. 2A and FIG. 2B) geometrically calibrated. In fact, we do not need it to be planar nor a grid for the framework to succeed. However, we have chosen this grid to be able to perform both the geometric calibration and color model estimation with a single image.

For estimation of the CCM the proposed approach may require the values of albedos to be known in advance, which can be done offline with a paper colorimeter. Although, the CCM may not be estimated in two-step optimization schemes.

2.2 Segmentation

Figure 2A:
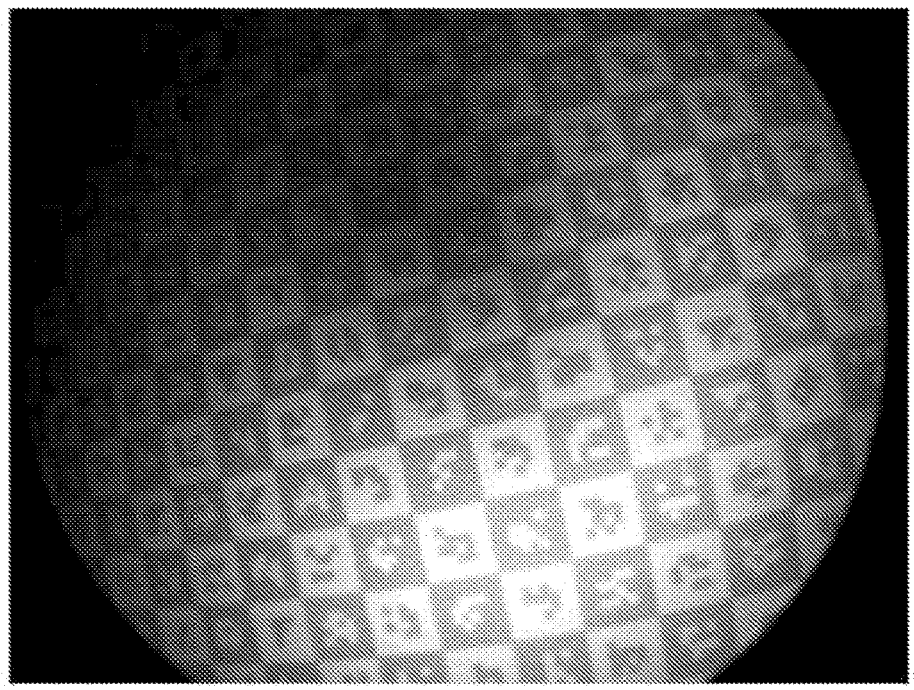
FIG. 2A shows an example of the calibration grid imaged with an endoscopic camera.
Figure 2B:
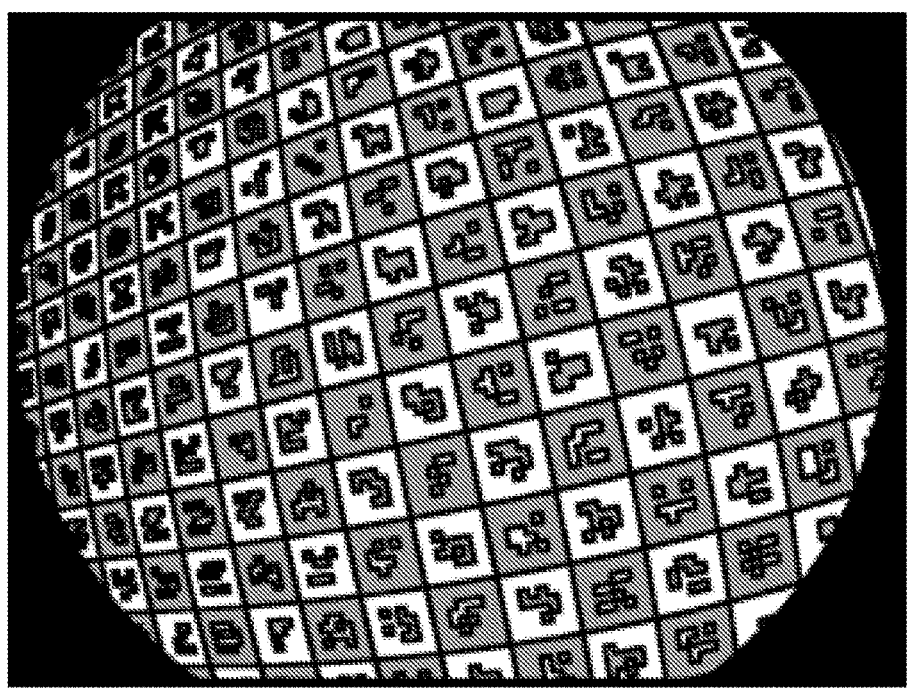
FIG. 2B shows an example of the segmentation of the calibration image into the two albedos where in white are the patches with lighter albedo and in gray are the patches with darker albedo.

Having used a method using CALTag grids, the segmentation is straightforward. Since the positions on the scene plane of every fiducial marker and grid corner are known or can be easily estimated, using the geometric calibration information, we can warp the grid to the image plane. This warped image is itself our segmentation. To avoid regions of blurring, a morphological erosion may be performed to both regions. FIG. 2A and FIG. 2B show a CALTag grid and its segmentation.

2.3 Joint CRF-CCM Estimation

Two approaches are presented here that are able to estimate the CRF and the CCM in a single optimization process. Both approaches derivate from (6). The first, the isocurves formulation, is more easily scalable and the second, the image formation modelling, achieves better results for a single calibration image.

2.3.1 Isocurve Formulation

The method may look for pixels, on a calibration image, where equations can be written with invariance to the vignetting and the light behavior. The method may look for pairs of pixels with different albedos for which both the vignetting and the light effect can be cancelled. On their approach, both the vignetting and the light effect remain constant between albedos (images of different ColorChecker patches). On a single-image approach, one cannot expect to find regions where both are constant without modelling them. However, in fact, the method may not need to be invariant to both effects, only to their joint effect, the ANI. In this way, we are able to build a system of equations where the only unknowns are the camera model, M and f, without making assumptions about the vignetting or the light behavior. This may be helpful for our set-up, since the vignetting may not be always central (as with most setups) and the lights are at close range, are typically not punctual, and may not be isotropic. More specifically, on the ith isovalue curve of the ANI, $$u(x_j) = \kappa_i = \frac{f_c^{-1}(d_c(x_j))}{\rho'_c(x_j)} \quad (7)$$

$\forall j \in \mathcal{L}$, where $\mathcal{L}$ is the set of pixels crossed by isovalue curve i and $k_i$ is a constant. Thus, if a curve i passes through multiple albedos ($\rho_1$ and $\rho_2$ as an example), one may have $$\rho'_{c,2} f_c^{-1}(d_c(x_j)) = \rho'_{c,1} f_c^{-1}(d_c(x_k)) \quad (8)$$

$\forall j \in \mathcal{L} \cap \mathcal{A}_{\rho_n 92_1}$, $\forall k \in \mathcal{L} \cap \mathcal{A}_{\rho_n \rho_2}$, with an equation for each pair of albedos on each isocurve. $\mathcal{A}_{\rho_n 92_2}$ is the set of points with a specific albedo $\rho_n$. This last equation may then be used for the single-image CRF estimation.

Figure 3A:
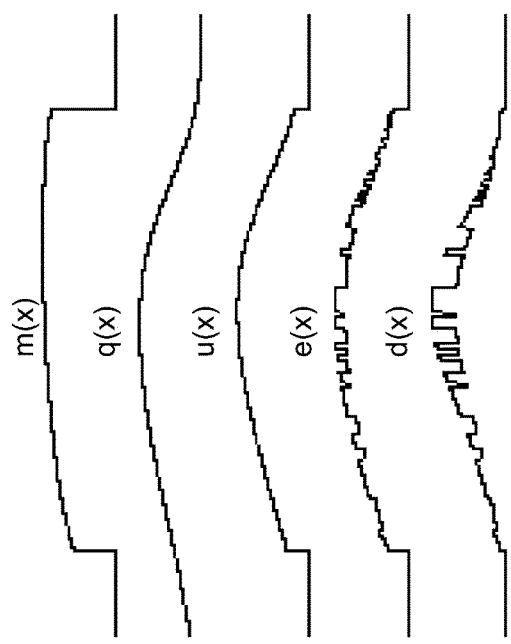
FIG. 3A shows an example of the values, in arbitrary units, of each image component showing the formation process of an image of a checkerboard along a horizontal line.
Figure 3A:
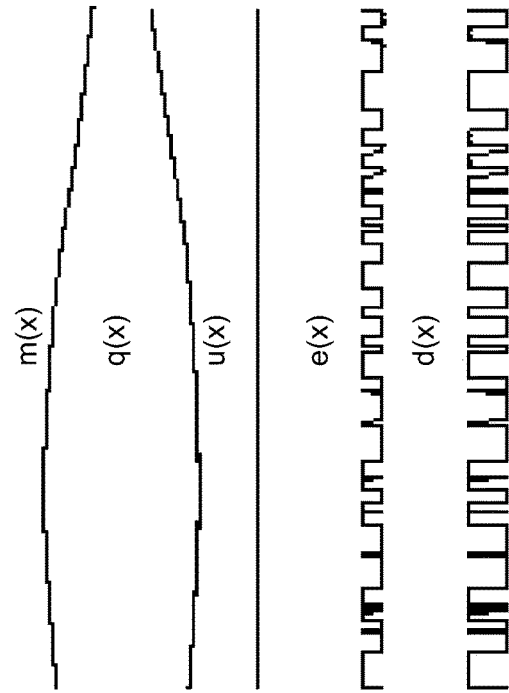
Figure 3A:
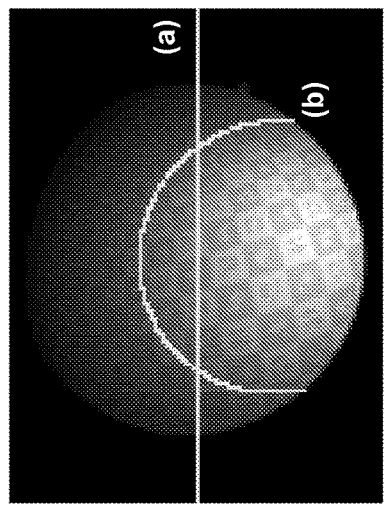

Since $u(x)$ is not known, we need to evaluate how its isocurves behave on the image $d(x)$. From (6), it is known that for a given albedo, an isocurve in the sensor irradiance is also an isocurve in the image. In addition, along an isocurve of $u(x)$, $\mathcal{L}_i$, the image values form a piecewise constant function (with a different constant value for each albedo). FIG. 3A shows each image component individually. Specifically, this behavior can be seen in FIG. 3B, which illustrates each image component on an isocurve of $u(x)$.

Figure 3B:
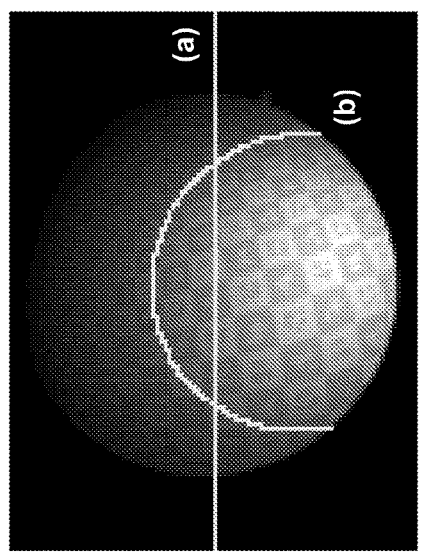
FIG. 3B shows an example of the values, in arbitrary units, of each image component showing the formation process of an image of a checkerboard along an isocurve of the irradiance normalized by albedo.

In the image space, an operator may have a set of isocurves for each albedo. However, the isocurves of $d(x)$ for each albedo are the same, and equal to the isocurves of $u(x)$, except for its value (FIG. 3B).

To find the isocurves of $u(x)$, the image may be modelled along one albedo $\rho_n$ as a generic model h where the isocurves are known. We can write for two albedos on the image space and a given color channel (single channel images can also be used)

$$d_c(x_j) = h_{c,1}(x_j)$$

$$d_c(x_k) = h_{c,2}(x_k) \quad (9)$$

$\forall j \in \mathcal{A}_{\rho_n \rho_1}$, $\forall k \in \mathcal{A}_{\rho_n \rho_2}$. From before, the isocurves of $h_{c,1}(x)$ and $h_{c,2}(x)$ may have the same shape as the ones in $u(x)$ but with different values. The shape of the surfaces represented by the models are different, since the step between isocurves varies from one formulation to the other, but the isocurves are the same. If we consider one of the albedos, let us say $\rho_1$, as a reference we can show that the two models are related by $$h_{c,1}(x_k) = f_c\left(\frac{\rho'_{c,1}}{\rho'_{c,2}} f_c^{-1}(h_{c,2}(x_k))\right) = g_{c,1,2}(h_{c,2}(x_k)) \quad (10)$$

$\forall k \in \mathcal{A}_{\rho_n \rho_2}$, where g is a positive and monotonically increasing function that is used to transform the model into the model $h_{c,2}(X)$. This function g is the equivalent of having a gain for each isocurve for the points of the albedo $\rho_2$, to be able to use only the model $h_1(x)$ (relative to the albedo $\rho_1$) for both albedos. More specifically, we have used a polynomial model for $h_{c,n}(x)=Bp$, where p are the polynomial coefficients and B is a matrix with each line of the form $b=(1, x, y, x^2, y^2, xy, \ldots)^T$. x and y are the image coordinates, i.e., $x=(x,y)^T$. This way we get $$b_j^T p = d_c(x_j)$$

$$b_k^T p = g_{c,1,2}(d_c(x_k)). \quad (11)$$

The isovalue curves may then be extracted as the level sets of the polynomial. As for the linear system of equation to be solved, it can be defined as $$\begin{bmatrix} b_j^T & 0^T \\ b_k^T & -s^T(d_c(x_k)) \end{bmatrix} \begin{bmatrix} p \\ g_{c,1,2} \end{bmatrix} = \begin{bmatrix} d_c(x_j) \\ 0 \end{bmatrix} \quad (12)$$

$\forall j \in \mathcal{A}_{\rho_n \rho_1}$, $\forall k \in \mathcal{A}_{\rho_n \rho_2}$, where g is a discrete array version of the function g and $s(n)$ is sparse vector with a single value of 1 on the element n.

Generalization for three or more albedos is straightforward and (10) can be generalized to work with multiple channels $$h_{c,n}(x_k) = f_c\left(\frac{\rho'_{c,n}}{\rho'_{c',n'}} f_{c'}^{-1}(h_{c',n'}(x_k))\right) = g_{c,c',n,n'}(h_{c',n'}(x_k)) \quad (13)$$

$\forall k \in \mathcal{A}_{\rho_n, \rho_{n'}}$, where $\rho_n$ and channel c are used as reference. When using multi-channel images, this step can also be performed once for each channel, on only one channel, or on a new computed channel with data from the other channels (e.g., grayscale version of an RGB image).

Figure 4A:
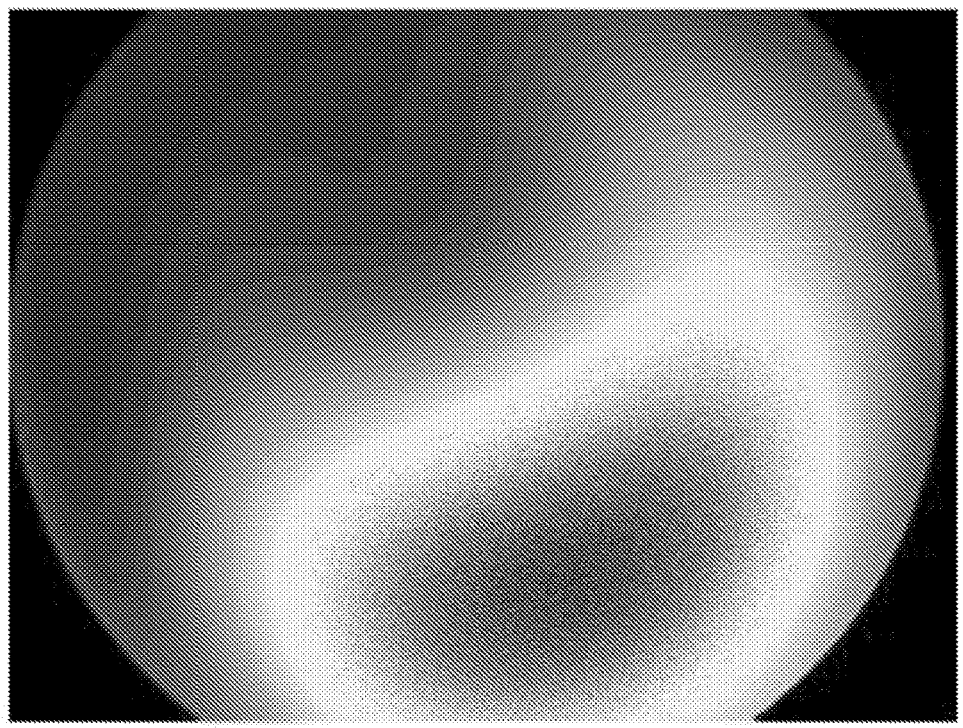
FIG. 4A is an example depiction of the estimated) (a surface with the same isocurves as the irradiance normalized by albedo).
Figure 4B:
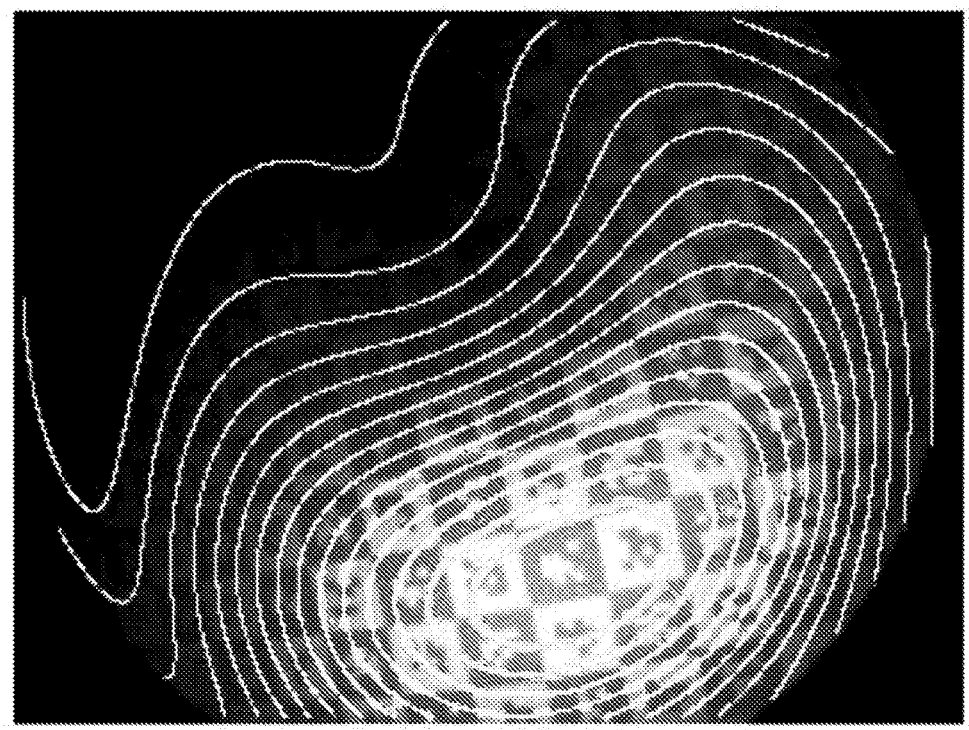
FIG. 4B is an example depiction of the calibration grid image superposed with some of h(x) isocurves.

An example of the determined isocurves can be observed in FIG. 4A and FIG. 4B.

Then, for a given isocurve i and albedo $\rho_n$ we compute $$\tilde{d}_{c,i,\rho_n} = \underset{j \in \mathcal{L}_i \cap \mathcal{A}_{\rho_n}}{\text{median}} \, d_c(x_j) \quad (14)$$

and, to estimate the CRF we rewrite (8) for albedos $\rho_n$ and $\rho_{n'}$ (not necessarily different) and channels c and c' (not necessarily different) as $$\rho'_{c',n} f_c^{-1}(\tilde{d}_{c,i,\rho_n}) = \rho'_{c,n} f_{c'}^{-1}(\tilde{d}_{c',i,\rho_n}) \quad (15)$$

If at least $N_c$ albedos are known and present in the calibration image, one may use equations of the form $\rho_s = m_s^T \rho'$, where $m_s^T$ are rows of M, to estimate the CCM on a subsequent step with a Moore-Penrose pseudo-inverse. Alternatively, they can be estimated jointly using as $$\rho_{s',n} m_s^T f^{-1}(\tilde{d}_{i,\rho_n}) = \rho_{s,n} m_{s'}^T f^{-1}(\tilde{d}_{i,6\rho_n}). \quad (16)$$

2.3.2 Image Formation Modelling

For this approach we model the image formation directly using (5). In this way, we also need to estimate u(x) on the same optimization step, which may be modeled as a polynomial, similarly to the previous approach. This approach is not as scalable as the previous one because a polynomial u(x) would have to be estimated for each calibration image and the resulting number of equations can become prohibitively high after a few additional images.

Specifically, to estimate the CRF we rewrite (5) as $$f_c^{-1}(d_c(x)) = u(x)\rho'_c(x) \quad (17)$$

If at least $N_c$ albedos are known and present in the calibration image, to estimate the CCM, one may use equations of the form $\rho_s = m_s^T \rho'$ as before. Alternatively, they can be jointly as $$m_s^T f^{-1}(d(x)) = u(x)\rho_s(x). \quad (18)$$

2.3.3 Optimization Schemes

Regarding both the isocurve and the image formation formulations, monotonicity constraints to $f^{-1}$ can also be enforced. To solve such system of equations, namely (15) to (18), one may use least squares in a standard non-linear optimization scheme, such as an interiorpoint algorithm. The CRF can be estimated non-parametrically and optionally parametrized in post-processing, or parametrized directly in the solver with, for example, a generalized gamma curve model and the empiric model of response (EMoR). This parametrization allows to define CRF for full range of possible values of pixel readings. Alternatively to use a parametric function, one can use interpolation and extrapolation methods. In all parametrization and interpolation/extrapolation approaches it can be advantageous to use generalized Tikhonov regularization.

Note that, if one can assume that M is a diagonal matrix and at least two albedos are known and present on the calibration image, then (16) and (18) can be solved with a convex linear optimization scheme, such as quadratic programming. This is also a good initialization for the non-linear optimization with a complete M.

2.4 Two-Step Estimation

By applying logarithm to (5) one can write $$\log f_c^{-1}(d(x)) = \log u(x) + \log \rho'_c(x) \quad (19)$$

which can be solved in a convex optimization framework. However, since only d(x) is known the problem can only be determined up to scale. Since we are using the logarithm space, such scale ambiguity becomes an exponential ambiguity. This ambiguity can be resolved by using EMoR and regularization on its coefficients.

The log u(x) function may be modeled with a bi-variate polynomial function like before and the CRF may be modeled with the log-inverse EMoR. Monotonicity constraints to $f^{-1}$ can also be enforced. To solve such system of equations, one may use least squares in a standard linear optimization scheme, such as quadratic programming.

After estimating the CRF, if at least $N_c$ albedos are known and present in the calibration image, the CCM matrix M can be determined from equations directly derived from $\rho_s = m_s^T \rho'$ on a subsequent step with a Moore-Penrose pseudo-inverse.

3. Vignetting Estimation

Even using simplistic models for both the light and the vignetting, to discern between the vignetting and the near-lighting effect is difficult, if not impossible, with a single-image. To model a light of this nature is not trivial, nor does the vignetting follow simple models. The vignetting does not follow the cosine fourth fall-off term, since radial distortion cannot be ignored, nor a circular behavior centered on the principal point, as in some optics the entrance pupils are not perpendicular to the optical axis. Due to these requirements, a method may be used to compute a vignetting model without making any assumptions on its shape. Therefore, unlike the CRF estimation procedure discussed in the previous section, the proposed vignetting estimation algorithm requires the use of a pair or two pairs of images.

At this point, the method may redefine the lighting effect to be a sum of the ambient light $\phi_0$ and the remaining effects q(x). As before, q(x) can be a single punctual light, or a sum of multiple punctual lights, or even an integral (or sum of integrals) for non-punctual lights. The method may consider a generic function, and may not make further assumptions besides the presence of a constant ambient light. The two images in each pair only need to differ in the intensity of the near-light, i.e., they differ only by a scale factor $\phi_{12}$ in the q(x) component. Thus, the following equation can be used for two same-pose images $$u_1(x) = \alpha_1 m(x)(\phi_{01} + q(x))$$

$$u_2(x) = \alpha_2 m(x)(\phi_{02} + \phi_{12} q(x)) \quad (20)$$

where $\phi_{12}$ is the ratio between the light intensities of the two images. Combining the two equations creates a generic form:

$$m(x) = k_1 u_1(x) + k_2 u_2(x) \quad (21)$$

when $$\begin{cases} \alpha_1 \kappa_1 + \alpha_2 \phi_{12} \kappa_2 = 0 \\ \alpha_1 \phi_{01} \kappa_1 + \alpha_2 \phi_{02} \kappa_2 \neq 0 \end{cases} \quad (22)$$

which describes the vignetting as a weighted sum of the ANIs of the two images, which are known (up to scale) from the previous section. Note that from the previous equation, the vignetting can only be estimated if $\phi_{02} \neq \phi_{12}\phi_{01}$.

At this point, the method can proceed in at least two directions. We can use two pairs of images and estimate vignetting function directly without assuming any vignetting shape, or use only two images for estimation, in which case further information is required. Below discusses the assumptions and the two vignetting algorithms in detail, both of which can be divided in two steps: computing the ANI and estimation.

3.1 Assumptions

For the vignetting estimation procedure, we assume that no shadows or other near-lights are present on the scene. Distant lights, such as the sunlight, are treated as ambient light as both are constant on the scene as long as the calibration target is planar. If the calibration target used is not planar, as long as there is no direct distant light, the method is still valid. In other words, the components that do not vary in intensity from one frame to the other may be spatially uniform on the scene.

As mentioned before, we also need to ensure that $\phi_{02} \neq \phi_{12}\phi_{01}$.

Besides the camera near-light intensity, the images can also differ in exposure (shutter speed and gains) and ambient light but not in pose, zoom or aperture.

3.2 Albedo-Normalized Irradiance

In this step, the CRF estimated with the disclosed method is used to compute an up-to-scale irradiance. Note that since two images may be used to estimate the vignetting, we can use the two together to compute the CRF, thus improving the estimation.

At this point, the method may normalize the irradiance by the albedos $\rho'$, which depends on the imaged scene. Since the method uses the CALTag checkerboards and the method has the segmentation, this is straightforward. Another possible approach would be to use a scene with only one albedo, e.g., a white sheet. However, at least one more shot would have to be performed to find the CRF.

3.3 Four-Image Vignetting Algorithm

Using two different-pose pairs of same-pose images we can write from equation (21), $$k_1 u_1(x) + k_2 u_2(x) = k_3 u_3(x) + k_4 u_4(x), \quad (23)$$

providing a 4 unknown system with a number of equations equal to the number of pixels in the image. This may be solved up-to-scale directly with no additional restrictions or assumptions.

The vignetting can then be computed with either the left or right term of equation (23), or by averaging the two. The scale of the vignetting can then be set by normalizing it to be positive and have a maximum value of one.

3.4 Two-Image Vignetting Algorithm

For the two-image approach, further information is required. Let us write the ratio between the two ANIs, $h(x) = u_2(x)/u_1(x)$, w.r.t. the light effect $$\phi_{01} + q(x) = \frac{\alpha_2(\phi_{02} - \phi_{12}\phi_{01})}{\alpha_1 h(x) - \alpha_2 \phi_{12}}. \quad (24)$$

By cancelling the vignetting effect, we have that whichever two points with the same ratio h(x) may have the value of q(x), the light component. Thus, the points of intersection between an isocurve of h(x) and an isocurve of $u_1(x)$ and/or $u_2(x)$, will satisfy constancy of both the light effect and the ANI. Consequently, these points may also have the same vignetting. We can define a fixed number of isocurves for h(x) and, for instance, $u_1(x)$. We can then intersect every isocurve of one with every isocurve of the other. The result may be a number of sets of points, where each set represents an intersection between two isocurves. We know from before that the vignetting is constant within each set. These points can be used establish a model for m(x) in equation (21). For instance, by fitting a family of ellipses to all points, knowing that each set of points may lie on the same ellipse. The family of ellipses that describes the vignetting can be used as a way to get more sets of points where the vignetting may be constant. Each set of points may give a number of equations equal to the number of points in the set. For a generic set of points $I_j = \{x_{j1}, x_{j2}, \ldots\}$ the equations are $$\begin{bmatrix} u_1(x_{j1}) & u_2(x_{j1}) & -s^\top(j) \\ u_1(x_{j2}) & u_2(x_{j2}) & -s^\top(j) \\ \vdots & \vdots & \vdots \end{bmatrix} \begin{bmatrix} \kappa_1 \\ \kappa_2 \\ v_m \end{bmatrix} = \begin{bmatrix} 0 \\ 0 \\ \vdots \end{bmatrix} \quad (25)$$

with $v_m$ being the vector form of the unknown vignetting values of the sets of points. The number of unknowns may be the number of sets of points plus two ($k_1$ and $k_2$) and the number of equations may be the total number of detected points in the previous step.

Another approach could be to use the family of ellipses as a domain to a generic function (e.g., polynomial function) and use this function as the vignetting model for equation (21).

Having estimated $k_1$ and $k_2$, we have an up-to-scale model for the vignetting. The scale of the vignetting can then be set by normalizing it to be positive and have a maximum value of one.

4. Experimental Validation

To validate the CRF estimation method, we have compared it to the Wu et al. approach. Six datasets were acquired with different set-ups, described in FIG. 5. The cameras used were a Point Grey (Point Grey Research Inc., BC, Canada) Flea3 CMOS USB3 camera, a Point Grey Grasshopper2 CCD FireWire camera, and a Sentech (Sentech Co. ltd, Kanagawa Prefecture, Japan) HD203DV CMOS HDMI camera. As for the lens, we have used a Smith & Nephew (Smith & Nephew plc, London, UK) Dyonics laparoscopic lens, a Smith & Nephew Dyonics arthroscopic lens, and a Stryker (Stryker Corporation, MI, USA) arthroscopic lens. We have used three different mount adaptors to couple the lens to the cameras and three different light sources. The gamma parameter intrinsic to the cameras was also altered between datasets to cover a wider range of scenarios. The albedo values necessary for our approach was previously determined using a calibrated Canon 600D (Canon Inc., Tokyo, Japan) and/or a paper trichromatic colorimeter.

Each dataset is composed of five CALTag grid images with different poses and one image of each of the 24 patches of the ColorChecker, all with the same pose and exposure. All CRF estimations, including the estimation from Wu et al. approach, are defined up-to-scale and, therefore, are not directly comparable. To be able to compare the CRFs we perform a linear optimization for each individual scaling factor (one for each estimation). FIG. 6A, FIG. 6B, FIG. 6C, FIG. 6D, FIG. 6E, and FIG. 6F shows the resulting CRFs using the isocurves formulation and a diagonal CCM for each dataset.

Our approach showed relatively high repeatability and invariance to the light source. On some cases, the extrapolation gives erroneous estimations, which is an expected behavior when the range of values on the image is small. For these cases, since the proposed method is scalable (as discussed in section 2.3), a multiple image approach can be used.

Note that this single-image approach successfully calibrated the sunlight dataset (R5), showing that it does not require both strong vignetting and near-lighting conditions.

In a few datasets, mainly R3 and R4, the estimation tends to deviate from the Wu et al. approach. However it still shows high repeatability.

Figure 7A:
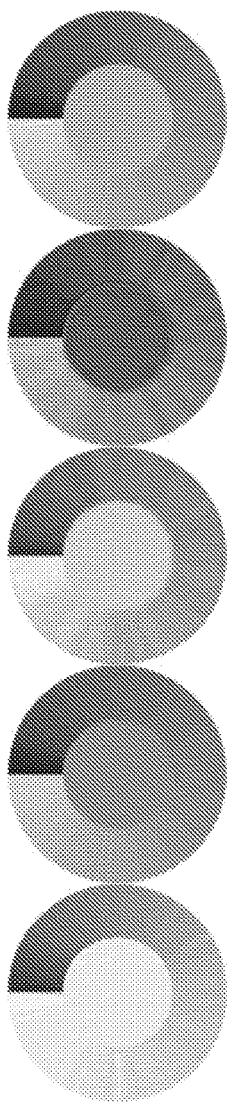
FIG. 7A, FIG. 7B, FIG. 7C, and FIG. 7D show embodiments of comparison of the algorithm variations. Each circle represents the ground truth color on the center patch and many segmented pixels on the outer ring. From left to right: input images before any correction (a) and the fully-corrected images using the isocurves approach (b), the direct approach (c), and the log-space approach (d). Note that the pixel values on the outer rings are meant to match their center patch only in terms of color, any variation in lightness/brightness is normal and necessary, and is meant to be ignored. This figure is designed to be seen in an sRGB display monitor. However, the improvement can be seen in most displays.
Figure 7B:
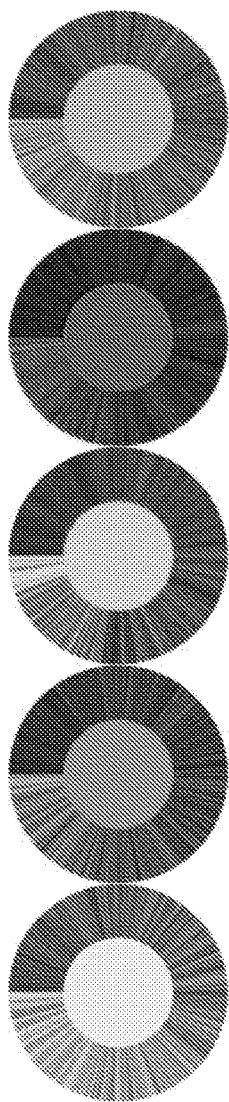
Figure 7C:
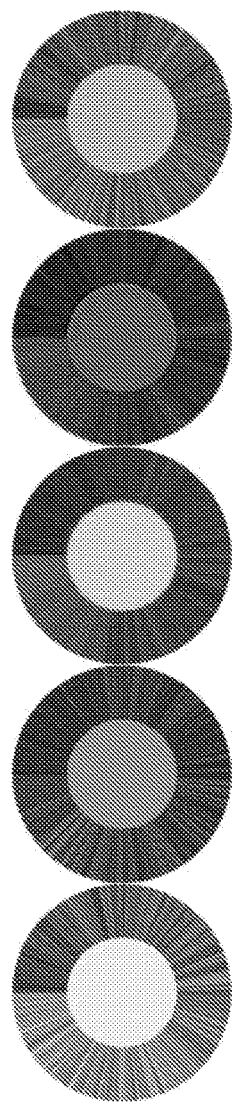
Figure 7D:
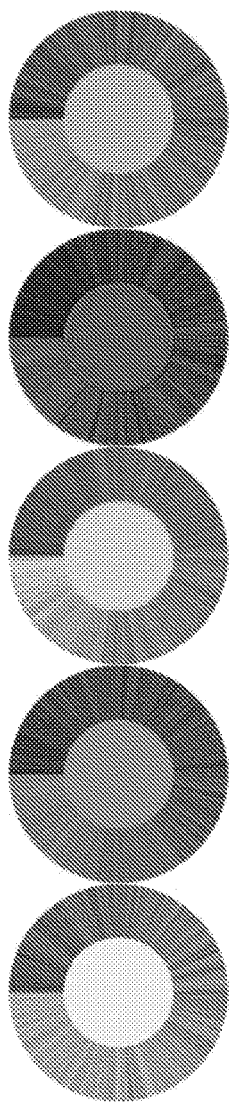

Another dataset has been used to compare the CRF and CCM estimation results. It is composed of 57 sets of 4 images each. Each set was acquired with a different acquisition setup. FIG. 7A, FIG. 7B, FIG. 7C, and FIG. 7D enable a perceptual comparison of the corrected colors in the calibration images using the estimated CRF and CCM. FIG. 7A depicts the original calibration images, FIG. 7B depicts the results for the isocurves joint-estimation formulation, FIG. 7C uses the direct joint-estimation approach, and FIG. 7D uses the two-step log-space approach. For fair comparison all approaches were performed with the estimation of a full 3 by 3 matrix for the CCM.

To validate the vignetting estimation, we acquired a dataset with the rig R2. In addition to the same-pose images required for the vignetting modelling, we acquired 5 images of a white paper under direct sunlight to have a ground truth vignetting.

Figure 8:
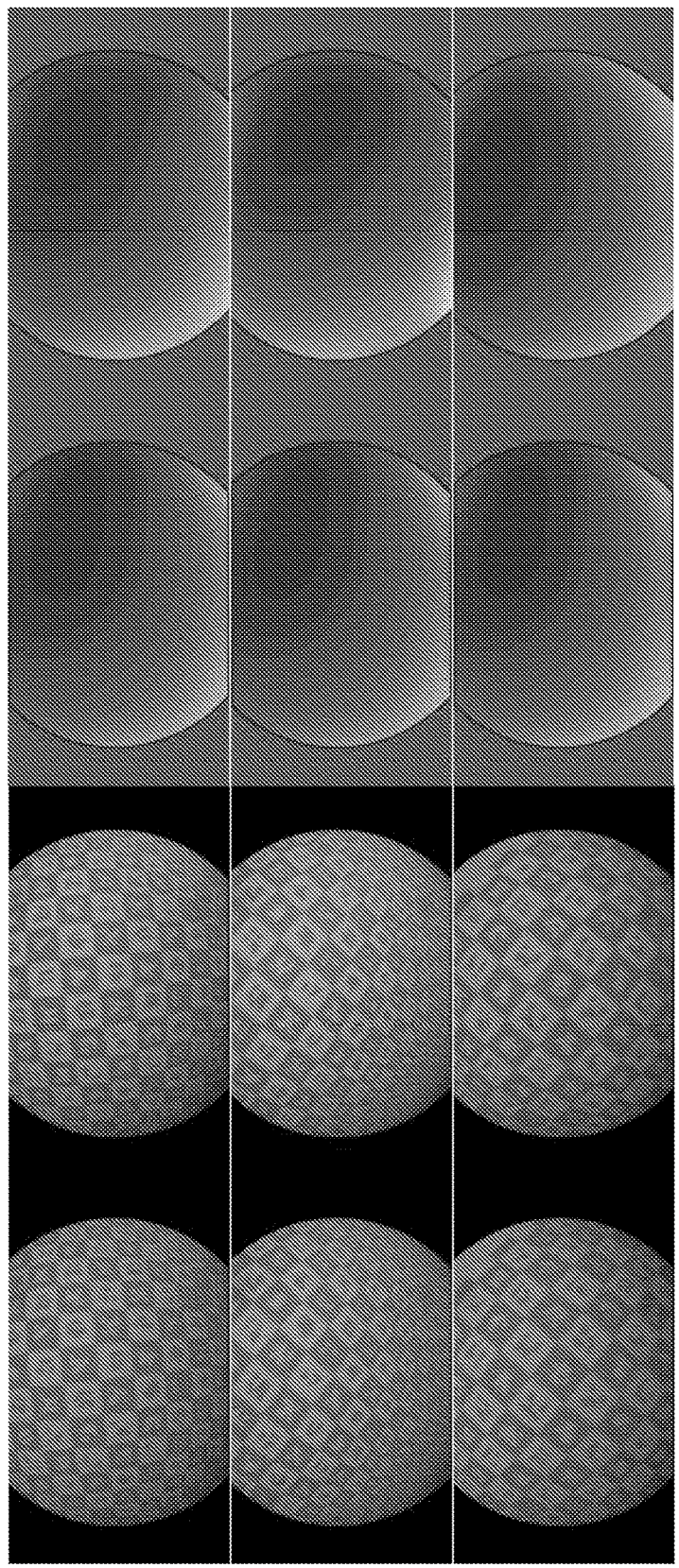
FIG. 8 shows an example of three different acquisitions with the same endoscopic rig. From left to right: the two same-pose images of the checkerboard used in the estimation, the ground truth vignetting, and the estimated vignetting using the two-image approach.
Figure 9:
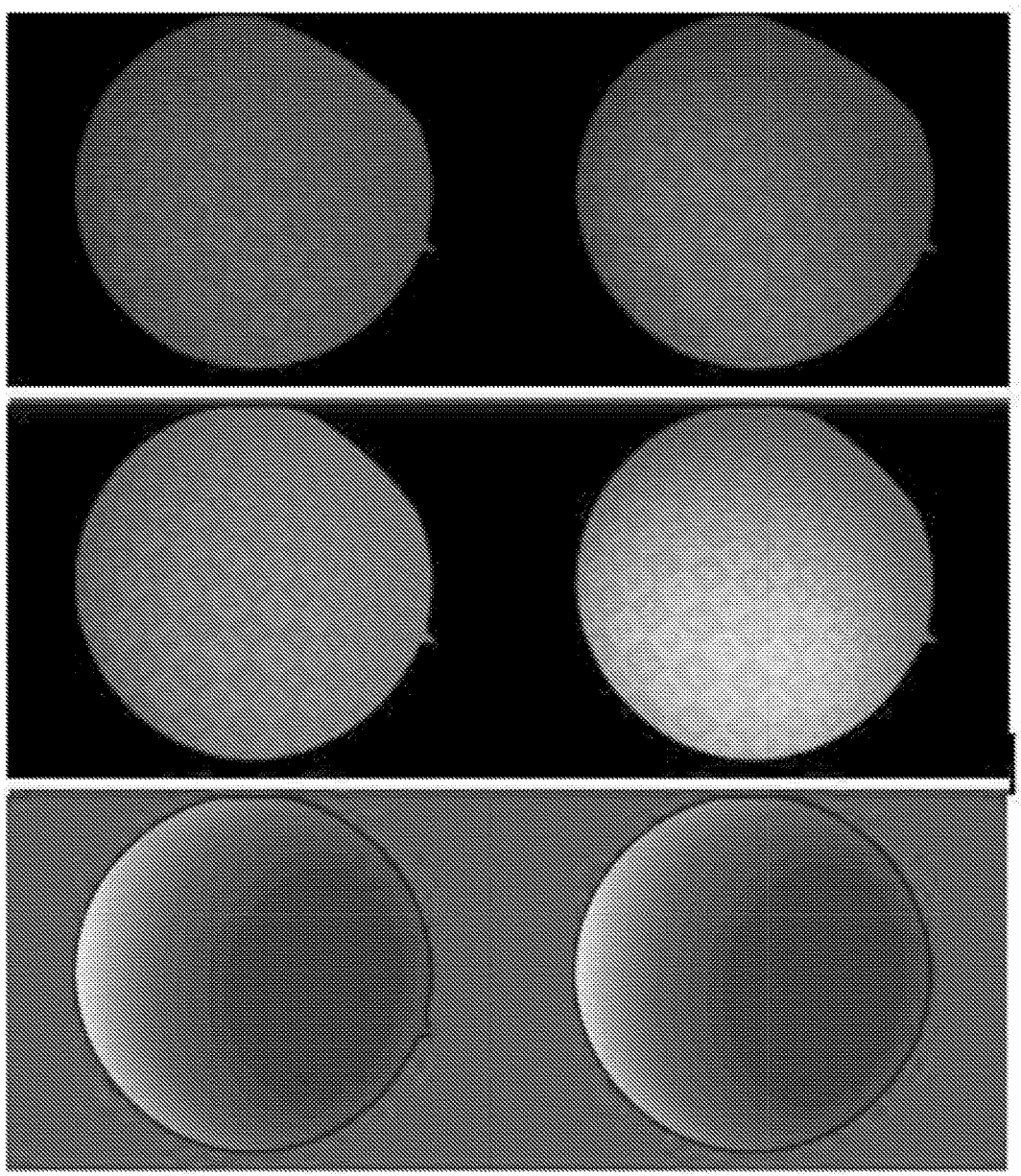
FIG. 9 shows an example of two pairs of same-pose images of the checkerboard, and on the last row, the ground truth vignetting and the estimated vignetting using the four-image approach.

The results are shown in FIG. 8 and FIG. 9. The results show good repeatability. FIG. 8 shows an example of three different acquisitions with the same endoscopic rig. From left to right: the two same-pose images of the checkerboard used in the estimation, the ground truth vignetting, and the estimated vignetting using the two-image approach. FIG. 9 shows an example of two pairs of same-pose images of the checkerboard, and on the last row, the ground truth vignetting and the estimated vignetting using the four-image approach.

Figure 10A:
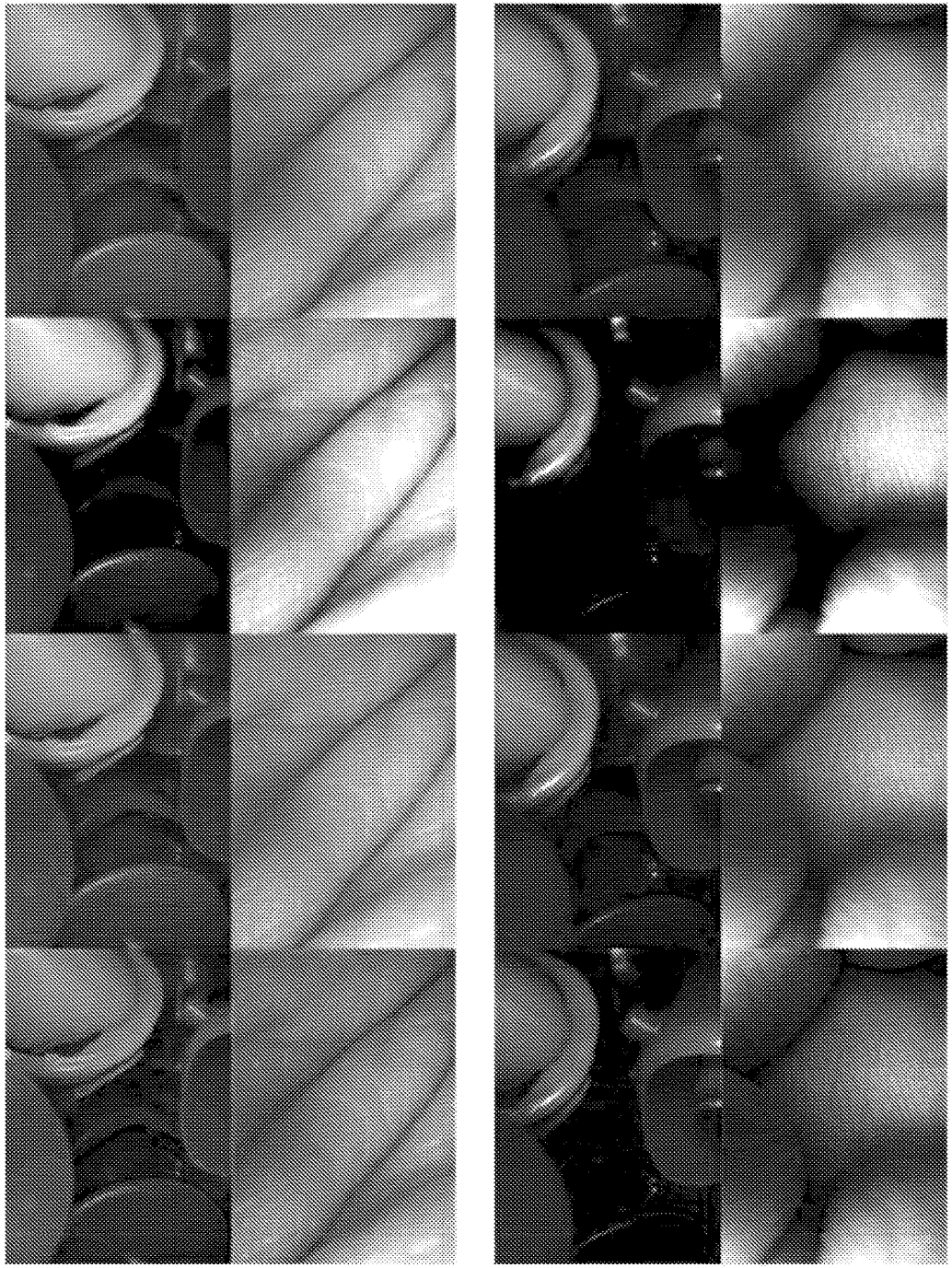
FIG. 10A shows an example of the application of standard image processing techniques for improved visualization on two images without previous radiometric calibration. From left to right: the original image and three different post-processing image visualization modes.
Figure 10B:
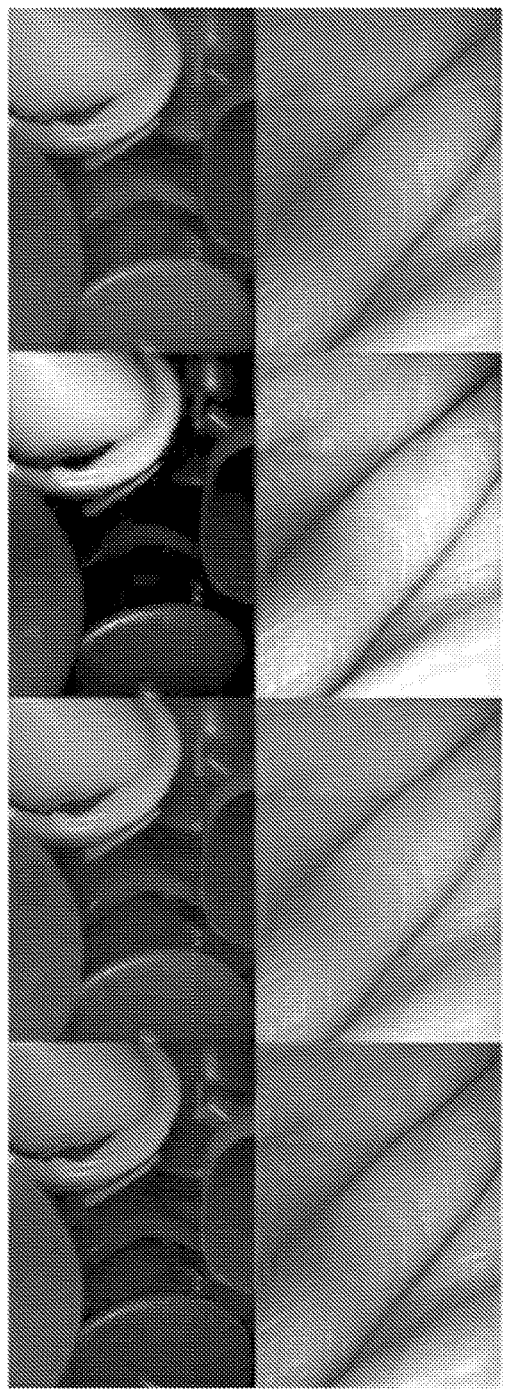
FIG. 10B shows an example of the application of standard image processing techniques for improved visualization on two images after having performed radiometric calibration. From left to right: the original image after CRF correction and three different post-processing image visualization modes.
Figure 10B:
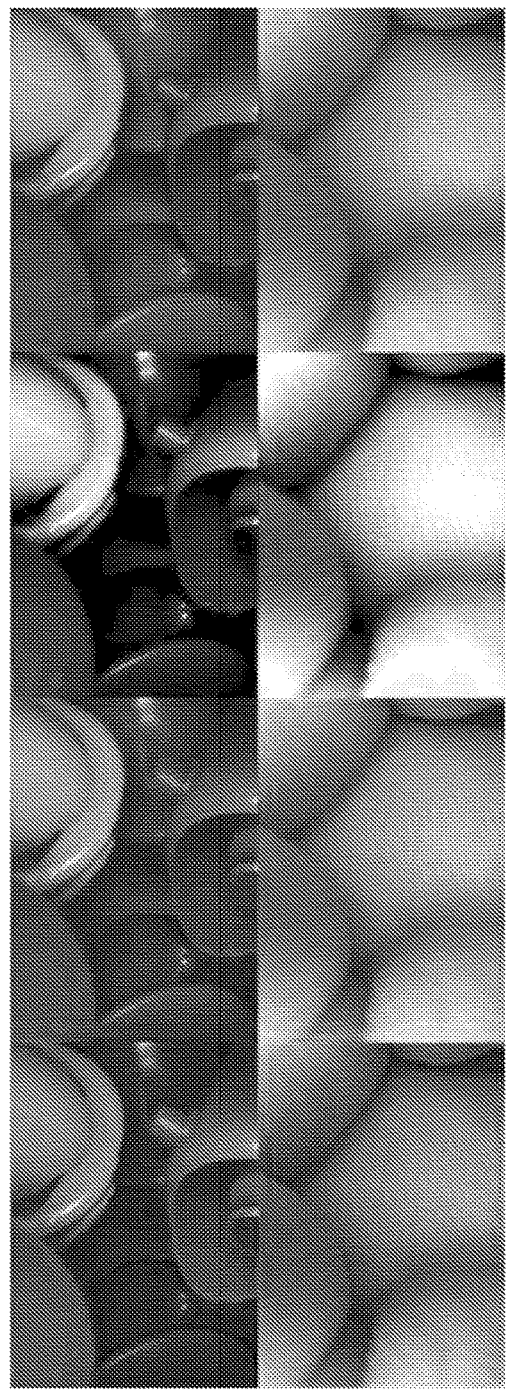

To illustrate the usefulness of camera characterization in clinical endoscopy we show the results of FIG. 10A and FIG. 10B. The color response of endoscopic systems varies substantially from system to system (different cameras, different optics, different light temperature, etc.). Therefore, the same scene can have substantially different appearance when imaged by two distinct setups (FIG. 10A) and can alter completely the color perception, which is important for diagnosis. The radiometric calibration followed by color normalization enables elimination of this variability (FIG. 10B). Color normalization is even more relevant when we take into account that there is a recent trend in using real-time image post-processing to enhance images in order to highlight specific anatomic structures and/or create certain effects. This is proved by the recent introduction of IMAGE 1 SPIES by STORZ (KARL STORZ Endoscopy-America, Inc., CA, USA) and i-scan imaging by PENTAX Medical (HOYA Corporation, PENTAX Life Care Division, Tokyo, Japan). This type of post processing effects include improving brightness of dark image areas, improving image sharpness, and/or modifying the color histograms by a transfer function to emulate multi-spectral image effects, such as narrow-bandwidth imaging (NBI).

5. Conclusions

We have proposed a single-image approach for estimating the color model under near-light and/or strong vignetting conditions, for which a general image of a two color (at least) albedo surface can be used and the vignetting effect from two same-pose images with different near-light intensities.

Unlike other single-image CRF calibration algorithms that require the detection of regions where light is constant on the scene and no vignetting is present, our approach benefits from the effects of near-lighting and vignetting to perform the estimation.

Similarly, the proposed vignetting estimation algorithm does not assume any specific shape nor tries to model (or make assumptions) on the incident light.

Our approach is especially suited for calibration of endoscopic rigs which suffer in general from radial distortion and, thus, we have proposed the use of CALTag grids so that the geometric calibration, the CRF estimation, and the color characterization can be performed with a single frame.

The CRF estimation method showed high repeatability and good results when compared to the 24 same-pose image calibration procedure. The described approaches are scalable. Additional images with the same set-up would provide additional equations that can be grouped together to improve the estimation even with different exposures, different poses, and changes in the vignetting (due to changes of zoom and/or aperture).

The vignetting step also showed good repeatability.

Figure 11:
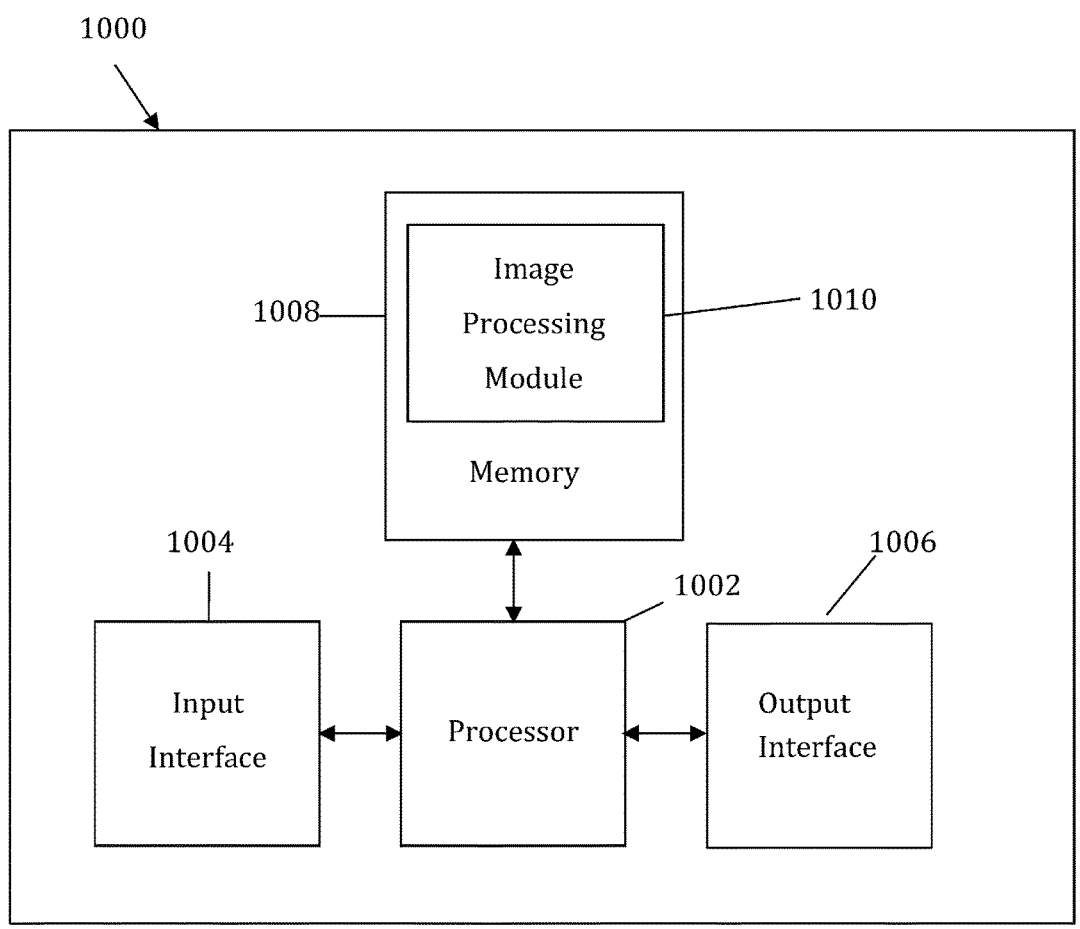
FIG. 11 illustrates an embodiment of an image processing system.

FIG. 11 is a schematic diagram of an embodiment of an image processing system 1000 that may correspond to or may be part of a computer and/or any other computing device, such as a handheld computer, a tablet computer, a laptop computer, a portable device, a workstation, a server, a mainframe, a super computer, and/or a database. The image processing system 1000 includes a processor 1002, which may be also be referenced as a central processor unit (CPU). The processor 1002 may communicate (e.g., via a system bus) and/or provide instructions to other components within the image processing system 1000, such as the input interface 1004, output interface 1006, and/or memory 1008. In one embodiment, the processor 1002 may include one or more multi-core processors and/or memory (e.g., cache memory) that function as buffers and/or storage for data. In other words, processor 1002 may be part of one or more other processing components, such as application specific integrated circuits (ASICs), field-programmable gate arrays (FPGAs), and/or digital signal processors (DSPs). Although FIG. 11 illustrates that processor 1002 may be a single processor, processor 1002 is not so limited and instead may represent a plurality of processors. The processor 1002 may be configured to implement any of the methods described herein.

FIG. 11 illustrates that memory 1008 may be operatively coupled to processor 1002. Memory 1008 may be a non-transitory computer readable medium configured to store various types of data. For example, memory 1008 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store computer executable instructions.

As shown in FIG. 11, the memory 1008 may be used to house the instructions for carrying out various embodiments described herein. In an embodiment, the memory 1008 may comprise an image processing module 1010 that may be accessed and implemented by processor 1002. Alternatively, the image processing module 1010 may be stored and accessed within memory embedded in processor 1002 (e.g., cache memory). Specifically, the image processing module 1010 may estimate the camera response function and the vignetting in case of non-uniform illumination using one or more calibration images. In one embodiment, memory 1008 interfaces with a computer bus so as to communicate and/or transmit information stored in memory 1008 to processor 1002 during execution of software programs, such as an operating system, application programs, device drivers, and software modules that comprise program code, and/or computer executable process steps, incorporating functionality described herein, e.g., the image processing module 1010. Processor 1002 first loads computer executable process steps from storage, e.g., memory 1010, storage medium/media, removable media drive, and/or other storage device. Processor 1002 can then execute the stored process steps in order to execute the loaded computer executable process steps. Stored data, e.g., data stored by a storage device, can be accessed by processor 1002 during the execution of computer executable process steps to instruct one or more components within the image processing system 1000.

Programming and/or loading executable instructions onto memory 1008 and processor 1002 in order to transform the image processing system 1000 into a non-generic particular machine or apparatus that estimates a camera response function and the vignetting in case of non-uniform illumination is well-known in the art. Implementing instructions, real-time monitoring, and other functions by loading executable software into a computer and/or processor can be converted to a hardware implementation by well-known design rules and/or transform a general-purpose processor to a processor programmed for a specific application. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions may be viewed as a non-generic particular machine or apparatus.

In addition, FIG. 11 illustrates that the processor 1002 may be operatively coupled to an input interface 1004 configured to obtain one or more images and output interface 1006 configured to output and/or display the calibrated images. The input interface 1004 may be configured to obtain one or more images via electrical, optical, and/or wireless connections using one or more communication protocols. In one embodiment, the input interface 1002 may be a network interface that comprises a plurality of ports configured to receive and/or transmit data via a network. In particular, the network may transmit image data via wired links, wireless link, and/or logical links. Other examples of the input interface 1004 may include but are not limited to a keyboard, universal serial bus (USB) interfaces, CD-ROMs, DVD-ROMs and/or graphical input devices (e.g., onscreen and/or virtual keyboards). The output interface 1006 may be an interface used to display information in a readable format for a user and/or used to transmit information to a separate apparatus or machine. Examples include, but are not limited to a graphic display (e.g., monitors and display screens), a user interface, an interface used to connect to a printing device configured to produce hardcopies of the generated results, and output ports used to connect to a network and/or another computing device. Image processing system 1000 may also include computing components not explicitly shown in FIG. 11, but well-known in the art, such as one or more power supplies, network interface(s), audio interfaces, displays, and circuitry used to connect the processor 1002, input interfaces 1004, output interface 1006, and memory 1008.

Figure 12:
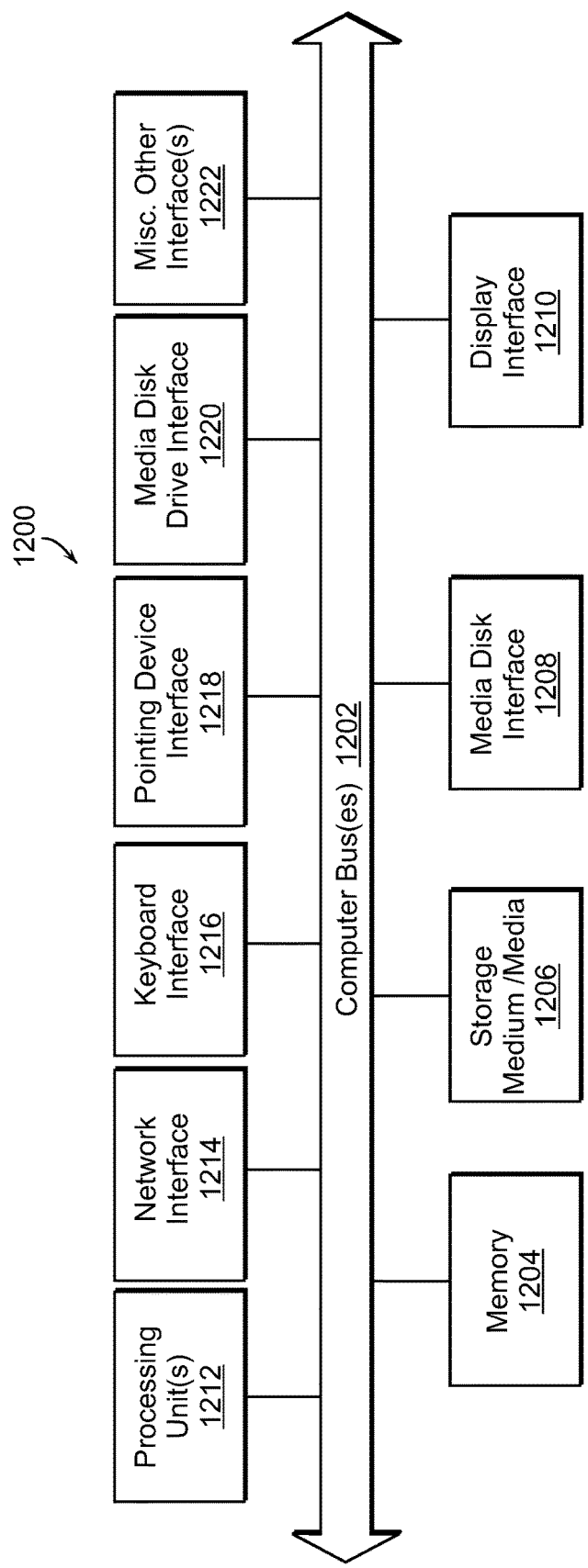
FIG. 12 is a schematic diagram of an embodiment of a computing device.

As shown in FIG. 12, internal architecture 1200 of a computing device(s), computing system, computing platform and the like includes one or more processing units, processors, or processing cores, (also referred to herein as CPUs) 1212, which interface with at least one computer bus 1202. Also interfacing with computer bus 1202 are computer-readable medium, or media, 1206, network interface 1214, memory 1204, e.g., random access memory (RAM), run-time transient memory, read only memory (ROM), media disk drive interface 1220 as an interface for a drive that can read and/or write to media including removable media such as floppy, CD-ROM, DVD, media, display interface 1210 as interface for a monitor or other display device, keyboard interface 1216 as interface for a keyboard, pointing device interface 1218 as an interface for a mouse or other pointing device, and miscellaneous other interfaces 1222 not shown individually, such as parallel and serial port interfaces and a universal serial bus (USB) interface.

Memory 1204 interfaces with computer bus 1202 so as to provide information stored in memory 1204 to CPU 1212 during execution of software programs such as an operating system, application programs, device drivers, and software modules that comprise program code, and/or computer executable process steps, incorporating functionality described herein, e.g., one or more of process flows described herein. CPU 1212 first loads computer executable process steps from storage, e.g., memory 1204, computer readable storage medium/media 1206, removable media drive, and/or other storage device. CPU 1212 can then execute the stored process steps in order to execute the loaded computer-executable process steps. Stored data, e.g., data stored by a storage device, can be accessed by CPU 1212 during the execution of computer-executable process steps.

Persistent storage, e.g., medium/media 1206, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure.

A network link typically provides information communication using transmission media through one or more networks to other devices that use or process the information. For example, the network link may provide a connection through a local network to a host computer or to equipment operated by a Network or Internet Service Provider (ISP). ISP equipment in turn provides data communication services through the public, worldwide packet-switching communication network of networks now commonly referred to as the Internet.

A computer called a server host connected to the Internet hosts a process that provides a service in response to information received over the Internet. For example, server host hosts a process that provides information representing video data for presentation at display 1210. It is contemplated that the components of system 1200 can be deployed in various configurations within other computer systems, e.g., host and server.

At least some embodiments of the present disclosure are related to the use of computer system 1200 for implementing some or all of the techniques described herein. According to one embodiment, those techniques are performed by computer system 1200 in response to processing unit 1212 executing one or more sequences of one or more processor instructions contained in memory 1204. Such instructions, also called computer instructions, software and program code, may be read into memory 1204 from another computer-readable medium 1206 such as storage device or network link. Execution of the sequences of instructions contained in memory 1204 causes processing unit 1212 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1200. Computer system 1200 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 1202 as it is received, or may be stored in memory 1204 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. A module, or software components of a module, may be stored on a computer readable medium for execution by a processor. Modules may be integral to one or more servers, or be loaded and executed by one or more servers. One or more modules may be grouped into an engine or an application.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, the various embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for estimating a color model of an imaging device, comprised of the response function and the color mapping, under generic illumination, the method comprising:
   i. acquiring at least one calibration image of a scene with at least two regions of constant albedo from an arbitrary pose;
   ii. segmenting the calibration image into regions of constant albedo and grouping the pixels in each region into a set $\mathcal{A}_{\rho_n}$, the set of points with albedo $\rho_n$;
   iii. deriving equations for the estimation using $$f^{-1}(d(x)) = u(x)\rho'(x)$$

where x are the pixel coordinates that correspond to a scene point, d(x) is the acquired image and is defined as a vector of $N_c$ elements $d_c(x)$ that correspond to values on pixel x and channel c, $f^{-1}(d)$ is the inverse camera response function, a function vector of elements $f_c^{-1}(d_c)$, u(x) is the albedo-normalized irradiance, a scalar function, and $\rho'$ is the albedo vector of size $N_c$ in the color space of the camera and is defined by elements $\rho'_c$ for each channel c such that $$\rho = M\rho'$$

with ρ being the albedo vector of size $N_s$ in the output color space and is defined by elements $\rho_s$ for each channel s, and M being a color mapping matrix of size $N_s$ by $N_c$ and composed of rows $m_s^T$; and iv. determining the color model of the imaging device by solving the equations derived in step iii using a suitable solver or optimization scheme.

2. The method of claim 1, wherein the scene used in step i is a known planar checkerboard pattern.

3. The method of claim 1, wherein $N_c=1$ for single-channel imaging devices, $N_c=3$ or trichromatic imaging devices, $N_c>3$ for multispectral and hyperspectral imaging devices, and $N_s=N_c$ for an output image with the same number of channels as the input image.

4. The method of claim 1, wherein the equations derived in step iii are defined directly from the image formation model as $$f_c^{-1}(d_c(x)) = u(x)\rho'_c(x)$$

or, equivalently, in the logarithmic space using $$\log f_c^{-1}(d_c(x)) = \log u(x) + \log \rho'_c(x)$$

where log stands for a logarithm of any base and where $d(x)$ is known and $f^{-1}$, $u(x)$, and $\rho'(x)$ are optimized for in step iv.

5. The method of claim 4, wherein the scene contains at least $N_c$ albedos of known values on the output color space, which enables the estimation of M after the estimation of $f^{-1}$, $u(x)$, and $\rho'(x)$ using equations of the form $$\rho_s = m_s^T \rho'$$

or together with the estimation of $f^{-1}$ and $u(x)$ using equations of the form $$m_s^T f^{-1}(d(x)) = u(x)\rho_s(x).$$

6. The method of claim 1, wherein the equations derived in step iii are defined on the isocurves of $u(x)$, in which case the $d(x)$ is known and $f^{-1}$ is optimized for in step iv.

7. The method of claim 6, wherein to estimate the isocurves of $u(x)$, a parametric model $h(x)$ is fitted to the regions of one albedo or more than one independently or using, for the purpose of incorporating more than one albedo on the same model and estimate only one set of isocurves, the following equations:

$$h(x_j) = d_c(x_j)$$
$$h(x_k) = g_{c,c',n,n'}(d_{c'}(x_k)), \quad j \in \mathcal{A}_{\rho_n}, k \in \mathcal{A}_{\rho_{n'}}$$

for a pair of albedos $\rho_n$ and $\rho_{n'}$, where $g_{c,c',n,n'}$ is a function that maps the values of albedo $\rho_{c',n'}$ to the model of albedo $\rho'_{c,n}, h(x)$, and where only $d(x)$ is known.

8. The method of claim 6, wherein the isocurves are used to establish equations of the form $$\rho'_{c',n} f_c^{-1}(d_c(x_j)) = \rho'_{c,n} f_{c'}^{-1}(d_{c'}(x_k)), j \in \mathcal{L}_i \cap \mathcal{A}_{\rho_n}, k \in \mathcal{L}_i \cap \mathcal{A}_{\rho_n}$$

for a pair of albedos $\rho_n$ and $\rho_{n'}$, where $\mathcal{L}_i$ is the set of pixels crossed by isocurve i, and where $d(x)$ is known and $f^{-1}$ and $\rho'(x)$ are optimized for in step iv.

9. The method of claim 8, wherein the scene contains at least $N_c$ albedos of known values on the output color space, which enables the estimation of M after the estimation of $f^{-1}$ and $\rho'(x)$ using equations of the form $$\rho s = m_s^T \rho'$$

or together with the estimation of $f^{-1}$ using equations of the form $$\rho_{s',n} m_s^T f^{-1}(d(x_j)) = \rho_{s,n} m_{s'}^T f^{-1}(d(x_k)), j \in \mathcal{L}_i \cap \mathcal{A}_{\rho_n}, k \in \mathcal{L}_i \cap \mathcal{A}_{\rho_n}.$$

10. The method of claim 1, wherein the equation derivation in step iii uses a particular case matrix for the color mapping matrix comprising a diagonal matrix or a rotation matrix.

11. The method of claim 1, wherein the solution of step iv is found using contributions from multiple calibration images, in which case steps i to iii are executed for each one of these images.

12. The method of claim 1, wherein the determination of the color model in step iv is carried together with one or more of monotonicity constraints on the camera response function and regularization of search parameters.

13. The method of claim 1, wherein for the purpose of having a camera response function defined for the whole range of possible pixel values d, a parametric function, an empiric model of response, or an interpolation/extrapolation method is used together with or as post processing to solving the system of equations in step iv.

14. The method of claim 1, wherein the optimization in step iv is executed with nonlinear optimization algorithms, comprising interior point, gradient descent, and metaheuristics, for the cases of systems of equations that are nonlinear, and it is executed with convex optimization algorithms, comprising quadratic programming, for the cases of system of equations that are linear.

15. The method of claim 1, wherein the color model of the imaging device is used to normalize the response function, by computing a new image where the pixel values $d'(x)$ are given by $$d' = f^{-1}(d)$$

for image points x or, in the case of the color mapping matrix being also known, are given by $$d' = M f^{-1}(d).$$

16. The method of claim 15, wherein the new image is computed for improved visualization and/or for further processing by other methods or algorithms, comprising shape-from-shading, photometric vision algorithms, computer-aided surgery methods, and transformations of pixel values for enhancing image properties or features, such as contrast or particular colors.

17. The method of claim 1, wherein the output color space is a standard color space, comprising CIEXYZ and sRGB, or other predetermined color space, comprising the color space of another imaging device.

18. The method of claim 1, wherein the algorithms presented may be used as a starting point of, integrated in, or complement other models of imaging devices, comprising multi-dimensional look-up tables.

19. A method for estimating a vignetting model of an imaging device comprising:
 i. acquiring at least one set of at least two calibration images with the same relative pose and a different intensity of a near-light source;
 ii. segmenting the calibration images into regions of constant albedo;
 iii. computing the albedo-normalized irradiance for each pair of same-pose images, $u_1(x)$ and $u_2(x)$;

iv. deriving the equations of the vignetting model using $$m(x)=K_1 u_1(x)+K_2 u_2(x)$$

where $K_1$ and $K_2$ are the two model unknowns; and v. finding a solution for the vignetting model with the equations created in step iv.

20. The method of claim 19, wherein, for the purpose of having additional equations, sets of points with equal vignetting are found in step iv by searching for points where one or more of both $u_1(x)/u_2(x)$ and $u_1(x)$ are constant and both $u_1(x)/u_2(x)$ and $u_2(x)$ are constant, which may be performed either by exhaustive search or by intersecting the isocurves of one or more of $u_1(x)/u_2(x)$ and $u_1(x)$ and $u_1(x)/u_2(x)$ and $u_2(x)$.

21. The method of claim 19, wherein the vignetting estimation equations in step iv, when two or more pairs of same-pose images are available can be defined as $$m(x)=k_1 u_1(x)+K_2 u_2(x)$$

$$m(x)=K'_1 u'_1(x)+k'_2 u'_2(x)$$

for every two pairs, which can be rewritten as $$k_1 u_1(x)+K_2 u_2(x)=K'_1 u'_1(x)+k'_2 u'_2(x)$$

and, in this way, creating a system of equations from which the vignetting model unknowns ($K_1$, $K_2$, $K'_1$, and $k'_2$) can be estimated.

22. The method of claim 19, wherein the vignetting model of the imaging device is used to normalize any acquired images and videos, for improved visualization and/or for further processing by other methods.

\* \* \* \* \*